(12) United States Patent
Ackley et al.

(10) Patent No.: US 9,533,280 B2
(45) Date of Patent: Jan. 3, 2017

(54) HIGH RATE COMPOSITIONS

(75) Inventors: Mark William Ackley, Tonawanda, NY (US); Philip Alexander Barrett, Tonawanda, NY (US); Neil Andrew Stephenson, East Amherst, NY (US); Eustathios S. Kikkinides, Thessaloniki (GR)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 681 days.

(21) Appl. No.: 13/530,209

(22) Filed: Jun. 22, 2012

(65) Prior Publication Data
US 2013/0340612 A1 Dec. 26, 2013

(51) Int. Cl.
*B01J 20/28* (2006.01)
*B01J 20/18* (2006.01)
*B01J 20/30* (2006.01)

(52) U.S. Cl.
CPC ............ *B01J 20/183* (2013.01); *B01J 20/2803* (2013.01); *B01J 20/28011* (2013.01); *B01J 20/3028* (2013.01)

(58) Field of Classification Search
CPC .............. B01D 53/02; B01D 2253/108; B01D 2253/304; B01J 20/183; B01J 20/28011; B01J 20/2803; B01J 20/3028
USPC ......... 95/90–148; 96/108–154; 502/400–438
See application file for complete search history.

(56) References Cited

U.S. PATENT DOCUMENTS

| | | |
|---|---|---|
| 5,672,195 A | 9/1997 | Moreau et al. |
| 6,171,370 B1 | 1/2001 | Hirano et al. |
| 6,245,940 B1 | 6/2001 | Tamion |
| 6,423,658 B1 | 7/2002 | Thonnelier et al. |
| 6,425,940 B1 | 7/2002 | Chao et al. |
| 6,500,234 B1 | 12/2002 | Ackley et al. |
| 6,506,234 B1 | 1/2003 | Ackley et al. |
| 6,652,626 B1 | 11/2003 | Plee |
| 6,790,260 B2 | 9/2004 | Ackley et al. |
| 7,300,899 B2 | 11/2007 | Weston et al. |
| 8,123,835 B2 | 2/2012 | Zheng et al. |
| 2006/0236861 A1* | 10/2006 | Patel et al. ........................ 95/96 |

(Continued)

FOREIGN PATENT DOCUMENTS

EP 2198964 A1 * 6/2010

OTHER PUBLICATIONS

Scott M. Auerbach et al., "Handbook of Zeolite Science and Technology", Jul. 31 2003, CRC Press, p. 480.*

(Continued)

*Primary Examiner* — Amber R Orlando
*Assistant Examiner* — Britanny Precht
(74) *Attorney, Agent, or Firm* — Ralph J. Mancini

(57) ABSTRACT

The present invention relates generally to compositions useful in adsorption and reactive processes comprising an adsorbent powder, such as a zeolite, and a binder mixed to form an agglomerate having a porosity of $0.30 \leq \epsilon_p \leq 0.42$ and a $N_2$ pore diffusivity $D_p \geq 3.5 \times 10^{-6}$ m$^2$/s and wherein the mean particle diameter of the crystalline zeolite powder is 10 μm or less; the mean particle diameter of the binder is 0.10 $d_A$ or less, and the binder concentration is 10% or less expressed on a dry weight basis.

24 Claims, 9 Drawing Sheets

(56) References Cited

U.S. PATENT DOCUMENTS

| | | | |
|---|---|---|---|
| 2006/0252631 A1* | 11/2006 | Deckman et al. | 502/60 |
| 2008/0308262 A1* | 12/2008 | Sauer et al. | 165/133 |
| 2010/0116134 A1* | 5/2010 | Zheng et al. | 95/90 |
| 2010/0196213 A1 | 8/2010 | Lutz et al. | |
| 2011/0104494 A1 | 5/2011 | Brandt et al. | |
| 2011/0105301 A1 | 5/2011 | Wang et al. | |
| 2012/0152115 A1 | 6/2012 | Gerds et al. | |
| 2013/0340614 A1* | 12/2013 | Barrett et al. | 95/96 |

OTHER PUBLICATIONS

Klebosol Colloidal Silica, Nov. 22, 2013, http://www.klebosol.com/products/.*

"What is the coefficient of variation?", Oct. 10, 2009, UCLA, all pages, http://www.ats.ucla.edu/stat/mult_pkg/faq/general/coefficient_of_variation.htm.*

Grace, "Ludox® Colloidal Silica in Coatings Lithium Polysilicate in Coatings", 2007, W. R. Grace & Co.-Conn., All pages Accessed Apr. 14, 2015 https://web.archive.org/web/20150414205032/https://grace.com/coatings-and-inks/en-us/Documents/LUDOX%20Coatings%20TI.pdf.*

* cited by examiner

Ideal Dense Packing of Mono-size Spheres

HIGH RATE COMPOSITIONS

FIELD OF INVENTION

The present invention relates to novel compositions useful in adsorption, separation, purification, and catalytic processes. More particularly, the invention is directed to adsorbents made from agglomerated crystallite particles having an improved pore morphology to enhance adsorption/separation performance. The present adsorbents exhibit enhanced adsorption rate properties, especially when used in gas separation processes.

BACKGROUND OF THE INVENTION

The manufacture of agglomerated zeolite adsorbent and catalyst compositions has been as much an art as a science, and much of the manufacturing knowledge is built upon a foundation of clay types or blends (e.g. attapulgite, sepiolite, kaolin, bentonite and so on) as the principal binding agent. A binding agent is necessary to prepare agglomerated zeolite based compositions, since the zeolite crystallites are not sufficiently self-binding. A binding agent therefore is used for the purpose of preparing zeolite agglomerates having adequate strength characteristics including crushing strength and attrition resistance for use in for example classical packed bed adsorption processes, including pressure swing adsorption (PSA), vacuum pressure swing adsorption (VPSA) and temperature swing adsorption (TSA) processes, and other reactive processes. While this invention is primarily directed to adsorbent compositions, the same principles discussed herein are also applicable to zeolite catalysts.

It has long been recognized that agglomerated adsorbents require a certain density to achieve the necessary resistance to crushing in commercial service, as well as sufficient porosity to avoid excessive resistance to transport of the adsorbing fluid components. Such compromise between strength and transport resulted in a relative narrow range of physical properties for agglomerated zeolite adsorbents, and, as recognized in U.S. Pat. No. 6,500,234, a similar narrow range of pore diffusivity. The pore diffusivity is a direct reflection of the complex interconnecting network of pores that make up the void structure within an agglomerated zeolite particle. The performance of an adsorbent in an adsorption application is dependent on several factors including, the adsorption capacity for the more strongly adsorbable gas, the relative selectivity of the gases in the mixture and the adsorption kinetics (resistance to fluid transport). Recently, there has been a drive to improve adsorptive separation performance by increasing the capacity and selectivity and decreasing the transport resistance of agglomerated adsorbent materials. The present invention is aimed at reducing the transport resistance of crystalline microporous solid adsorbents, preferably zeolite based adsorbents, while maintaining adequate crushing strength, adsorptive capacity, and selectivity.

Prior teachings seek to improve adsorptive separation performance by increasing adsorption rate through the formulation and processing of the agglomerated adsorbent material. However, most of this art ascribes adsorption kinetics to a limited (and possibly misleading) description of pore morphology obtained by Hg porosimetry characterization. Hg porosimetry characterization is based upon an assumed straight cylindrical pore geometry and can be misleading when there are large volumes connected by narrow pores (sometimes referred to as "ink bottle pores"). While Hg porosimetry characterization is a useful technique for determining porosity, particle density and effective "cylindrical" pore size distribution, the method provides insufficient information regarding pore length, shape, connectivity or tortuosity. It is clearly evident that the intrinsic pore diffusivity of agglomerated particles is directly dependent upon the geometry of the macropores present within said particles. As used herein, the term "geometry of the macropores" is intended to be equivalent to the terms "void structure," "pore geometry" and "pore morphology." This pore geometry is the result of a complex (tortuous) network of interconnecting pores of varying size, shape and length which, as taught in this disclosure, is derived from an elaborate interplay between the size, shape, distribution and amounts of the fundamental adsorbent and binder particles which are combined together by the agglomeration process to form the adsorbent agglomerate. By its very nature such geometry is difficult to define or characterize in detail. Hg porosimetry characterization provides an incomplete picture, i.e. total macropore porosity, cumulative pore volume, mean pore diameter and pore size distribution, and does not provide a complete description of the void structure. This fact has been at least recognized in fundamental studies, e.g. "pore size distributions, however, provide incomplete descriptions of the connectivity among voids, which are essential to describe transport dynamics in porous solids" (Zalc, J. M., et al., "The Effects of Diffusion Mechanism and Void Structure on Transport Rates and Tortuosity Factors in Complex Porous Structures," Chem. Eng. Sci., 59, 2947-2960, 2004). In addition to the fact that pore size and pore size distributions are referenced to cylindrical pores in Hg porosimetry characterization, these results can also be misleading for some pore networks due to the sequential filling of large to small pores with increasing Hg pressure. Despite the recognition of this complex pore structure, the prior art oversimplifies the full range of porous solid adsorbent characteristics needed to understand and achieve improved transport kinetics.

U.S. Pat. No. 6,171,370 discloses a clay-bound low silica type X (LSX) zeolite with $SiO_2/Al_2O_3$ from 1.9 to 2.1, "wherein the average pore diameter of the macropores is equal to or larger than the mean free path of an adsorbable component when desorbing the adsorbable component from the adsorbent." The fractional volume of macropores of such average pore diameter is prescribed to be at least 70% as characterized by Hg porosimetry. The invention is directed to LiX adsorbents for separating air to produce $O_2$. Sepiolite and attapulgite clay binders as "needle crystals" in the form of fibers are preferred to form the macropores.

U.S. patent application (US2011/0105301) discloses a faujasite (type X) zeolite with $SiO_2/Al_2O_3$ from 2.1 to 2.5, a mean transport diameter >300 nm and a mesopore fraction <10% as characterized by Hg porosimetry. A method of producing a binderless NaX (2.35) zeolite is also disclosed. This method involves the addition of kaolin or meta kaolin clay and subsequent caustic digestion to transform the clay to zeolite. The adsorption capacity of the binderless agglomerate (for $CO_2$, $H_2O$ and $N_2$) is equivalent to the raw zeolite powder before adding the binder and subsequent digestion/granulation.

The effect of adsorption rate upon the separation of isomers of aromatic hydrocarbons in the liquid phase using BaX and BaKX zeolites is disclosed in US2011/0105301. The process for making such adsorbents includes the addition of a zeolitizable clay binder such as kaolin. This binder is added in amounts from 5 wt % to 0.12 wt % and subsequently converted to zeolite by caustic digestion. The agglomerated zeolite has a total pore volume of at least 0.26 ml/g wherein at least 60% of this pore volume is within a pore diameter range of 100 nm-500 nm as characterized by Hg porosimetry. Also disclosed is the addition of a combustible pore forming agent or "shaping auxiliary" with subsequent burn out thereof during calcination.

U.S. Pat. No. 6,500,234 discloses a process for the separation of nitrogen from gas mixtures using adsorbents having a mass transfer coefficient for $N_2$ of $k_{N2} \geq 12$ s$^{-1}$ and an intrinsic diffusivity for $N_2$ (when measured at 1.5 bar and 300K)$\geq 3.5 \times 10^{-6}$ m$^2$/s. Adsorbents meeting these requirements are disclosed in co-filed U.S. Pat. No. 6,425,940. The improved intrinsic diffusivity of such adsorbents is the result of forming agglomerates with a low amount of clay binder and the subsequent caustic digestion and conversion of that binder to zeolite. Furthermore, the process of making such adsorbents is said to result in the formation of a "trunk" and "tributary" macropore system where the "trunk" pores are in the range of 0.1-1.0 μm and the "tributary" pores are less than 0.1 μm as characterized by Hg porosimetry. U.S. Pat. No. 6,425,940 also discloses caustically digested binderless adsorbents that include pore-directing or pore-forming additives such as Nylon or Rayon fibers or corn starch. Such additives are burned out during calcination to form a bidisperse macropore system resulting in improved gas transport properties.

As shown from the above patents, several attempts have been made to correlate "higher rate characteristics" of adsorbents to parameters derived from Hg porosimetry characterization of the adsorbent or with the Knudsen number (Kn). Such attempts are not believed to be fully instructive and fail either because of incomplete or inaccurate characterization of the pore geometry. Both Kn and Hg porosimetry techniques rely upon defining the pores in terms of simple straight cylinders which is an oversimplification of the pore structure. Furthermore, Kn (which is the ratio of molecule-pore wall collisions to molecule-molecule collisions) depends upon accurate definition and determination of a "characteristic length," e.g. Kn=λ/l, where λ=mean free path and l=characteristic length. The characteristic length is a complex function of the pore geometry and cannot be simply defined by an average equivalent cylindrical pore diameter determined by Hg porosimetry.

Attempts to define adsorbent materials with low transport resistance are further diluted by the use of gross separation performance as a measure of improved rate effects and fail to accurately incorporate the fact that such processes are nonlinear and that separation performance can be affected by equilibrium and physical (in addition to kinetic) characteristics of the adsorbent. Correlations between rate and pore volume and/or pore diameter of the adsorbent are viewed as inadequate and fail to provide the necessary link between the intrinsic diffusivity of the agglomerated adsorbent and a detailed description of its macropore morphology. In short, the prior art fails to adequately identify useful high rate adsorbent materials and/or reliable and cost-effective methods for producing them.

Intrinsic diffusivity is a property of the porous solid material, correctly reflects the transport dynamics imposed by the void structure, and is a necessary criterion for defining any "high rate" adsorption material. In the absence of an accurate means to characterize the detailed pore geometry and an explicit relationship between this geometry and the transport dynamics, intrinsic diffusivity is the most direct and effective measure of the product of specific ingredients and the method of combining them into an agglomerated adsorbent.

It is noteworthy that the bulk of commercial zeolite adsorbents are clay bound, primarily due to the successful balance achieved between transport and strength. However, for the very reasons that clay binding agents achieve adequate strength characteristics, they are found to be limiting with respect to achieving lower transport resistance. It is further observed that the physical properties (namely shape and size) of clay binders are inherently difficult to control during agglomeration and in post processing treatments of the agglomerate. To further overcome some of these transport limitations of clay based adsorbent formulations, the prior teachings have turned to the use of caustic digestion processes, with and without the use of supplemental pore forming agents, to prepare essentially binderless adsorbents by conversion of zeolitizable clays, to active adsorbents. However, whilst there are examples where pore diffusivities of the adsorbent materials are reported and shown to have been improved, these improvements are by no means guaranteed by virtue of the complex pore geometry discussed above. Moreover, additional steps, time and often equipment are required which increases the manufacturing complexity and adsorbent cost.

The problem remains of how to predictably develop a binder containing agglomerated adsorbent composition, including a method of making the same, to maximize its intrinsic pore diffusivity which in turn will enhance adsorptive separation performance. The present invention solves this problem by first creating and manipulating the pore morphology of the agglomerated adsorbent using developed model constructs of porous materials, relying only upon the physical properties of the adsorbent and binder particles rather than their chemical composition. The diffusion of gas is then simulated in a variety of model porous materials having different void structures to identify parameters of the solid material that minimize transport resistance, i.e. maximize intrinsic diffusivity. The result is a prescription for creating an ideal high rate adsorbent composition. This prescription is then applied within the limitations (both physical and compositional) of the available raw materials to identify and produce commercial zeolite based adsorbent compositions with high intrinsic diffusivity.

BRIEF SUMMARY OF INVENTION

The present invention provides a composition useful in adsorption and reactive processes comprising a adsorbent powder and a binder mixed to form an agglomerate having a porosity of $0.30 \leq \epsilon_p \leq 0.42$ and a $N_2$ pore diffusivity $D_p \geq 3.5 \times 10^{-6}$ m$^2$/s and wherein the mean particle diameter ($d_A$) of the adsorbent powder is 10 μm or less; the mean particle diameter of the binder is 0.10 $d_A$ or less, and the binder concentration is 10% or less expressed on a dry weight basis.

In another embodiment, this invention provides an adsorption process for adsorbing or separating a more strongly adsorbable component from a fluid mixture containing at least one more strongly adsorbable component and at least one less strongly adsorbable component comprising contacting the fluid mixture with an adsorbent material which selectively adsorbs the at least one more strongly adsorbable component and the at least one less strongly adsorbable component is recovered as product and wherein the adsorbent composition comprising a crystalline adsorbent powder and a non-clay type binder having a porosity of $0.30 \leq \epsilon_p \leq 0.42$ and a $N_2$ pore diffusivity $D_p \geq 3.5 \times 10^{-6}$ m$^2$/s, and wherein the mean particle diameter of the adsorbent powder is 10 μm or less, the mean particle diameter of the binder is less than or equal to 0.10 $d_A$, and the binder content is 10% or less expressed on a dry weight basis.

DETAILED DESCRIPTION OF THE INVENTION

High Diffusivity Motivation

Figure 1:
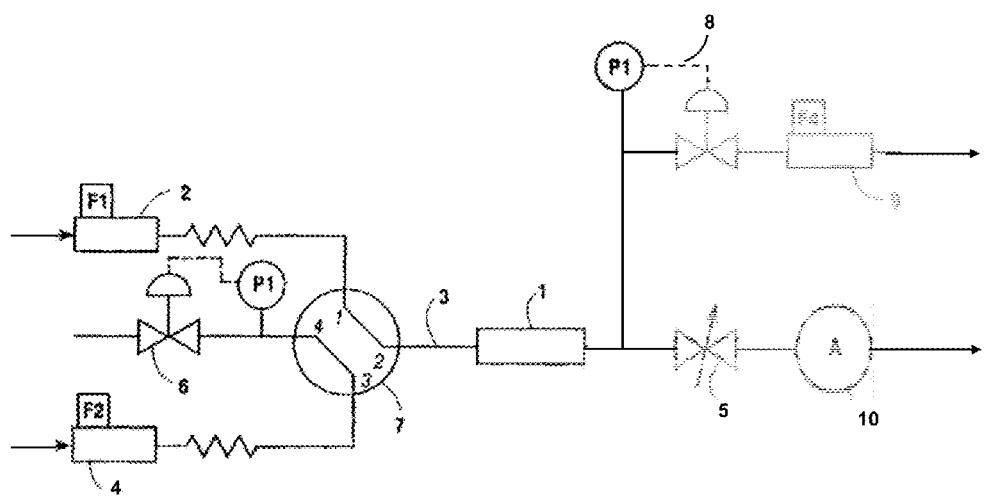
FIG. 1 is a schematic of the low dead volume test (LDVT) apparatus used to perform breakthrough tests.

Processes utilizing adsorption can be characterized as a combination of equilibrium and kinetic effects. Even in equilibrium-driven separations, the kinetic component can often be critical to achieving maximum performance economically. U.S. Pat. Nos. 6,500,234 and 6,506,234 teach that unexpectedly high gains in performance can be obtained when the intrinsic diffusivity of the adsorbent is increased. The central problem now becomes how to increase the intrinsic diffusivity while maintaining adequate strength within reasonable porosity limits of the agglomerated adsorbent particle. The pore diffusivity can be manipulated through specific formulation and/or processing of the adsorbent. For example, U.S. Pat. No. 6,425,940 employs a reduced content of clay binder and subsequent caustic digestion of the clay to convert binder to zeolite. This binderless formulation represents a first departure from the conventional clay binder approach and can also be combined with other techniques such as combustible fiber and/or particulate additives and subsequent burn-out.

These methodologies and others alike attempt to direct the formation of pores through the use of binders and/or additives followed by their conversion or burnout to leave a more favorable pore structure for fluid transport. Such adsorbent materials incorporating clay binders and other pore-forming additives followed by caustic digestion and/or burn-out are difficult and expensive to manufacture, limited in the degree of diffusivity improvement realized and are inconsistent in performance. In particular, clay binders tend to form spongy elongated particles that fill pores between the zeolite crystallite particles. This pore filling is amplified by the conversion of clay to zeolite by caustic digestion as the newly formed zeolite has a higher porosity than the dense clay. In short, clay binders are difficult to control with respect to directing a consistent pore structure throughout the agglomerate forming, ion exchange and activation processes. The present invention addresses these short comings by developing a model-directed approach to define ideal building blocks of the adsorbent agglomerate followed by selective relaxation of the ideal criteria to minimize limitations imposed by the use of real materials in the formulation.

The impact of diffusivity upon adsorption separation performance can be established through various rate equations. These relationships and their use have been summarized in U.S. Pat. Nos. 6,500,234; 6,506,234; and 6,790,260 and are repeated here for completeness and clarity. For the purpose of this invention, intrinsic diffusivity, average particle diameter and porosity define the properties of the novel agglomerated compositions of this invention.

Although not intending to be limited by the examples, this invention is demonstrated for adsorbent compositions particularly suited to gas phase separations in which the mass transfer resistance is dominated by diffusion in the macropores of the adsorbent particle, i.e. pores of dimension at least an order of magnitude greater than the diameter of molecules diffusing into or out of the particle. Considering the fact that most common atmospheric gases have a kinetic diameter in the range of 2.6 Å to 4.5 Å, this minimum average cross section dimension of the macropores is the order of 30 Å to 40 Å. Macropores are defined herein as those pores having a diameter (equivalent cylindrical diameter) in the range of approximately 0.0030 µm to 20 µm, which corresponds also to the range of measurement by the standard mercury porosimetry method.

The impact of kinetics upon separation efficiency is a consequence of the resistance to mass transfer, which in turn determines the adsorption rate. A linear driving force (LDF) model (E. Glueckauf, Trans. Faraday Soc. 51, 1540, 1955) can be used to represent adsorption rate $$\left(\frac{\partial \overline{w_i}}{\partial t}\right)_i \rho_b \frac{\partial \overline{w_i}}{\partial t} = k_i(c_i - \overline{c_{s_i}}) \quad (A\text{-}1)$$

where ($w_i$) is the average loading of adsorbate (i), $\rho_b$ is the packed density of the adsorbent in the bed, $c_i$ and $c_{si}$ are average adsorbate gas phase concentrations in the bulk fluid and inside the agglomerated particle in equilibrium with the adsorbate loading, respectively. The term in the brackets is the "concentration driving force." $k_i$ is the mass transfer coefficient which can be represented as a combination of the intrinsic diffusion properties of the adsorbent and adsorbent particle properties as follows:

$$k_i = \frac{15\varepsilon_p(1-\varepsilon_b)D_{pi}}{r_p^2} \quad (A\text{-}2)$$

where $D_{pi}$ is the intrinsic pore diffusivity, $\epsilon_p$ is the void fraction inside the agglomerate which for the purposes of this example varies from 0.30 to 0.42, $\epsilon_b$ is the interparticle bed void fraction (void fraction external to the agglomerated particles) which typically varies from about 0.34 to 0.37 for densely packed beds of spherical particles, and $r_p$ is the particle radius. The geometry of the macropores is imbedded in the term $D_{pi}$. The intrinsic diffusivity ($D_{pi}$) is a reflection of the detailed pore morphology and thus all of the pore geometry that defines this morphology. The explicit relationship between the diffusion characteristics and geometry of the pores remains unsolved. The intrinsic diffusivity (a property of the material) becomes the most effective means to measure the rate-effectiveness of a porous material in a separation process.

However, more effective means of controlling the pore geometry are needed to minimize transport resistance in the agglomerated adsorbent. The terms intrinsic diffusivity and pore diffusivity are used as equivalent terms herein and refer to the property (diffusivity) of the agglomerated particle that results from the pore morphology or pore structure of the agglomerate.

Equations A-1 and A-2 provide a convenient model to relate the various parameters that effect adsorption rate. While other mechanisms such as micropore diffusion, surface diffusion, film diffusion and bulk phase axial diffusion may influence the mass transfer coefficient, macropore diffusion dominates for many important separations.

The mass transfer coefficient $k_i$ can be determined by fitting the appropriate model to data obtained from a breakthrough experiment. Since $\epsilon_p$, $\epsilon_b$ and $r_p$ can all be determined by measurement, the intrinsic diffusivity $D_{pi}$ is solved by rearranging the terms in Equation A-2. The rate parameter ($k_i$) enters directly into the detailed equation set describing (and used to model or characterize) the separation process and its performance.

Equations A-1 and A-2 form the bridge between the intrinsic diffusivity and the resultant mass transfer resistance parameters affecting the separation process. The intrinsic diffusivity ($D_{pi}$) is a semi-empirically-determined parameter, and determination must be consistent with the characterization of the adsorption rate, i.e. the rate Equation A-1 employed in the model of the breakthrough experiment must be the same as that used in the model representing the separation process of interest. The breakthrough experiment employed to obtain the mass transfer rate coefficients and effective diffusivities is briefly described below. One skilled in the art will recognize that variations of this experiment may be used as long as the guiding criteria stated above (macropore diffusion control) are followed.

For the process of air separation as used herein, a breakthrough test is performed in two steps in which the flow rate, pressure and temperature of the feed gas are the same in both steps. This process will be described with reference to FIG. 1. The first step involves saturation of the adsorbent bed 1 with $O_2$, the least selective component, provided via flow meter 2 and line 3. In the second step, air or a synthetic air mixture containing $N_2$ and $O_2$ is then introduced to bed 1 via flow meter 4 and line 3. Valve 6 operates in conjunction with flow meter 4 such that pressure of the air or synthetic air is maintained in an external loop until four port valve 7 connects the air or synthetic air feed to line 3 such that the air/synthetic air flows into bed 1. The pressure, temperature and composition of the feed mixture in the second step should be representative of that in an adsorption step of an actual process, e.g. 1.5 bar, 300K and feed air composition. The molar flux was approximately 10 mol/m$^2$ s, although this flux may be varied as required. The pressure is maintained substantially constant in bed 1 by using a control valve 8 located on the downstream side of adsorbent bed 1. The endspace and connecting piping dead volumes are designed to be 5% or less than that of the adsorbent bed volume (approximately 20 cm$^3$).

The flow rate and concentration of $O_2$ are continuously and accurately monitored throughout step two via flow meter 9 and oxygen analyzer 10 until the breakthrough of $N_2$ is complete. Flow to analyzer 10 is maintained at a fixed amount via fixed valve 5. In step two, the more selectively adsorbed $N_2$ displaces the adsorbed $O_2$ already in the bed 1. As the bed nears saturation with the air mixture, the breakthrough of $N_2$ is reflected in a decrease in the $O_2$ concentration and an increase in overall flow rate of the effluent from the bed. The piping and adsorbent bed are maintained at the same temperature as the feed by immersing them in a thermostat bath controlled at the same temperature as the feed.

A computer-aided mathematical model representing the test is now applied to simulate the breakthrough test. A detailed adsorption model, based upon the governing material and energy balances involved in the process, is incorporated in the model. This model uses the same rate expression as that shown in Equation A-1. The model used here is represented by one dimensional plug flow with negligible axial dispersion. Additional characteristics of the model include: pressure drop (as determined by Darcy's Law or by the Ergun Equation), multicomponent isotherm (as determined by the loading ratio correlation), and adsorption rate (as determined by the linear driving force). A thermal energy balance was used to account for heat transfer through the wall of the adsorbent bed. Simulations were performed by varying the mass transfer rate coefficients, $k_{N_2}$ and $k_{O_2}$ until the breakthrough effluent flow rate and concentration profiles of the simulation matched those of the experiment. Having determined the rate coefficient $k_{N2}$, the effective $N_2$ diffusivity $D_{pN2}$ was extracted from Equation A-2. For the purpose of this invention, $D_{pN2}$ is the representative parameter characterizing the gas transport dynamics within the macropores of the agglomerated adsorbent particle. All pore diffusivities reported herein are $N_2$ diffusivity determined at 1.5 bara and 300K. $D_{pN2}$ should not be considered limiting as materials having the highest $N_2$ intrinsic diffusivity will also have the highest diffusivity of other gas components.

The breakthrough test and system described above are particularly useful in determining the $N_2$ macropore diffusivity of $N_2$-selective adsorbents. One skilled in the art will readily appreciate that the ranking of adsorbents relative to the most desirable rate characteristics by this method is applicable to gases and separations beyond the separation of $N_2$ and $O_2$ from air. For adsorbents produced according to the teachings of the present invention and are not $N_2$-selective), then one skilled in the art will also recognize that the methodologies described above can be directly applied using a different pair of gases such that the diffusivity determined for the most selective gas becomes the effective ranking parameter for the adsorbents of interest.

The relative effects of molecular and Knudsen diffusion (particularly in model porous structures such as packings) can be described by the Bosanquet equation (Equation A-3). Diffusion within the macropores of any particle can be characterized by a combination of molecular and Knudsen diffusion for simple cylindrical geometry:

$$\frac{1}{D_e} = \frac{1}{D_{e,b}} + \frac{1}{D_{e,K}} \qquad \text{(A-3)}$$

Where $D_{e,b}$ is the "bulk" or molecular diffusion component representing molecule-molecule collisions and $D_{e,K}$ is the Knudsen diffusion component representing collisions of the molecules with the pore wall. The Knudsen number ($Kn=\lambda/d_p$) is a measure of the relative magnitude of the number of molecule-wall collisions to molecule-molecule collisions. Bulk diffusion dominates when $Kn\ll1$, Knudsen diffusion dominates when $Kn\gg1$. $\lambda$ is the mean free path (distance traveled between molecule-molecule collisions), while $d_p$ is the characteristic pore diameter (equivalent cylindrical or hydraulic diameter). As discussed earlier, Kn depends upon accurate definition and determination of a "characteristic length," e.g. $Kn=\lambda/l$, where l is a characteristic length, as well as the process conditions as reflected in $\lambda$. The characteristic length is a complex function of the pore geometry and cannot be simply defined by an average equivalent cylindrical pore diameter determined by Hg porosimetry characterization. For these reasons, Kn determined from Hg porosimetry characterization does not adequately define the void structure of a porous material.

Porosity $\epsilon_p$ represents the fraction of voids inside the particle as measured by Hg porosimetry. For the purpose of the present invention, the desired porosity range is $0.30\le\epsilon_p\le0.42$. This range of porosities is selected to produce the following combination of benefits: to insure physical strength of the agglomerate particle or bead; to minimize storage of gas in the non-selective voids of the particle contributing to reduced separation efficiency; and to maximize zeolite content such that a high adsorption capacity per unit volume of bed is maintained. It will be shown that this relatively narrow range of porosity is non-limiting with respect to intrinsic diffusivity, i.e. a wide range of diffusivities has been produced within this porosity range.

3-D Reconstruction Followed by Diffusivity Modelling

One way to overcome the shortcomings of Hg porosimetry characterization alone is to reconstruct the macrostructure of agglomerated particles through rigorous mathematical means. While such methods are complex, the science, mathematics and computational power have matured to the point of text book description for at least a framework of analysis, e.g. Torquato, S., *Random Heterogeneous Materials, Microstructure and Macroscopic Properties*, Springer, New York, N.Y. (2002). This invention uses a combination of stochastic characterization methods combined with particle imaging and diffusion modeling to obtain a macrostructure of agglomerated adsorbent particles (see below). Similar strategies have been applied using Monte Carlo methods with model sphere packings to study tortuosity in porous structures (Zalc, J. M., et al., Chem. Eng. Sci., 59, 2947-2960, 2004).

While general methodologies for structure characterizations exist, it was necessary to develop custom models and computational techniques in order to achieve accurate and useful representations of real adsorbent particles. While the details of these models and techniques are not repeated here, the methodologies are outlined and the key results are presented.

A stepwise strategy was adopted to characterize the macrostructure of conventional adsorbent particles as follows:

produce a set of back-scattered scanning electron micrographs (SEM) of real particle cross sections, digitize the two-dimensional (2-D) image to create a binary image, clearly distinguishing solid from void, verifying that the digital image of the SEM matches the porosity attic real particles, reconstruct, with the aid of a stochastic model, a three dimensional (3-D) digital representation from the 2-D digital image, preserving the basic structural statistical properties (mainly porosity and two-point correlation function) measured in the SEM micrograph.

use the 3-D structure to simulate the diffusion of $N_2$ probe molecules in its void space, compare the resultant diffusivity from simulation with that obtained experimentally for the adsorbent particles of interest.

For the purpose of the present invention, the void structure and its effects upon transport dynamics are directly and best represented by the pore diffusivity.

Test Example

Figures 2, 3:
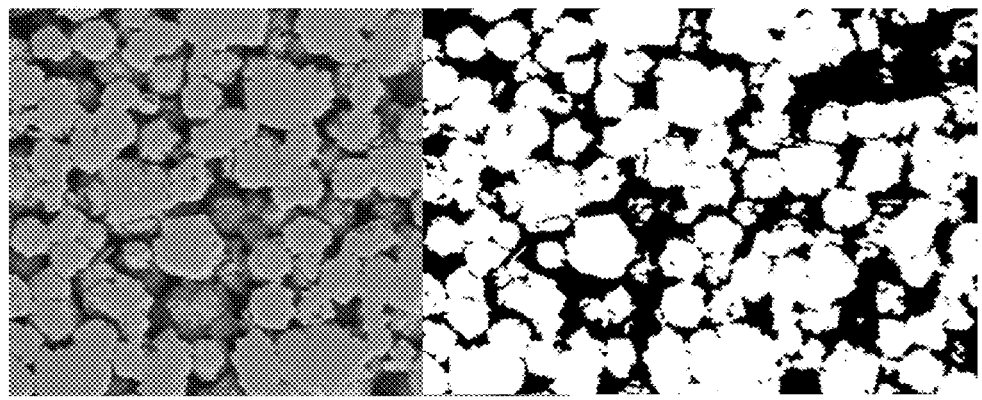
FIG. 2 is a Scanning Electron Micrograph (SEM) of a cross section of a LiX (2.0) cd bead (Z-2).
FIG. 3 is the 2D binary (digital) image of the SEM in FIG. 2.
Figure 4:
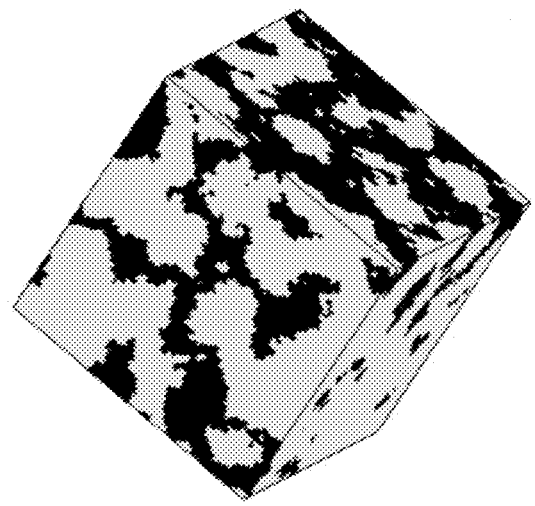
FIG. 4 is the 3D reconstructed image of the Z-2 prior art adsorbent from the SEM images in FIGS. 2 and 3.

A high rate LiX (2.0) adsorbent made using caustic digestion (c.d.), Z-2according to U.S. Pat. No. 6,506,234, was cross-sectioned and analyzed by SEM at 4500×magnification using the methods described in U.S. Pat. No. 6,425,940. A representative SEM of this adsorbent is shown in FIG. 2. Using the stochastic reconstruction methods briefly described above, 2D and 3D digitized images were reconstructed from the source SEM as shown in FIGS. 3 and 4, respectively. The porosity and diffusivity of the real adsorbent determined experimentally by the methods described above are 0.379 and $4.2 \times 10^{-6} m^2/s$, respectively, as disclosed in U.S. Pat. No. 6,506,234. The porosity of the reconstructed image was 0.32, although it was determined that about 0.04 additional porosity was present for pores of size less than 0.1µm, i.e. below the resolution of the SEM photomicrograph and thus did not translate to the reconstructed image. $N_2$ diffusion modelling utilizing the 3D reconstruction yielded an intrinsic diffusivity of $4.33\times10^{-6}m^2/s$.

For transport dominated by macropore diffusion, i.e. other transport mechanisms such as micropore diffusion occur much faster than macropore diffusion, the transport resistance should be independent of whether or not adsorption occurs in the micropores. The fact that the $N_2$ diffusivity obtained by experiment (adsorption present) agrees well with that obtained from diffusion modelling using the 3D reconstructed agglomerate (adsorption not included) confirms this expectation. Moreover, this observation further supports the generalization of results obtained from $N_2$ diffusivity to other permanent gases in zeolites.

The very good agreement in these results validates the methodology described above. These developed software tools can now be used to evaluate and probe the pore structure of real adsorbents from their digitized analogs. Moreover, these tools can be used to digitally create ideal agglomerates using various properties and then the agglomerates can be studied to determine the most important parameters required to achieve high intrinsic diffusivity.

Theoretical Study of Random Sphere Packings (RSPs)

Having developed a set of software tools for characterizing both structure and diffusivity of real agglomerated adsorbent particles, attention is devoted to studying physical parameters of "ideal" or theoretical agglomerated particles using random spherical particle packings (RSPs). Molecular dynamics software tools were developed and applied to construct model agglomerates comprising spherical adsorbent crystallite and binder particles of varying size, shape and relative proportion. The resultant diffusivities, determined by simulation, then revealed the combination of "ideal properties" leading to minimum resistance to mass transfer, i.e. maximum macropore diffusivity. The diffusion modelling was carried out at a temperature of 300K and at pressures of 1.5 bara and 0.5 bara.

Figure 5:
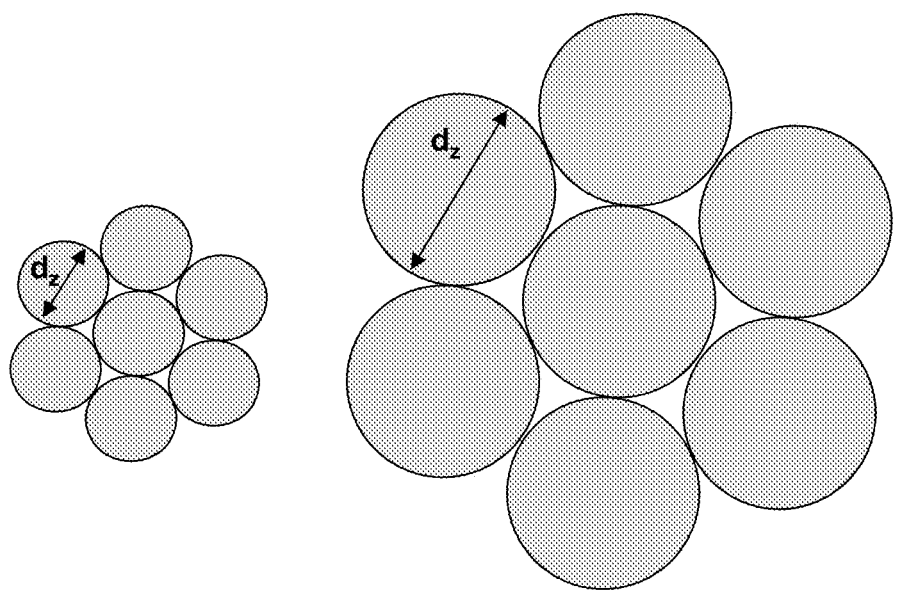
FIG. 5 shows two ideal dense packings for mono-size spheres (large and small spheres).

In these ideal particle packing studies, binder and adsorbent particles are distinguished only by size and number, i.e. the resultant pore morphology depended only on the physical properties of the binder and adsorbent particles, and not their chemical composition. "Densification" of the model packing is performed by the well-known method of Lubachevsky and Stillinger (Lubachevsky and Stillinger F. H., J. Stat. Phys. 60, 561, 1990) which allows the diameter of the spherical particles to grow linearly in time until a near maximum packing density is obtained which corresponds to a void fraction of 0.35-0.36 for a monodisperse packing. It was found that the largest diffusivity is achieved when the largest spherical particles comprising the bound adsorbent agglomerate are of uniform diameter, i.e. adsorbent and binder particles alike are the same size, monodisperse and as large as practical. Such a construct results also in the largest pores between the packed microparticles as illustrated in FIG. 5 where the space between the packed spheres of both large and small monodisperse sphere packing is compared. Monodisperse RSPs were generated using particle diameters ($d_z$) from 2 μm to 40 μm. A practical upper diameter limit for most microporous crystalline adsorbent powder particles, including real zeolite powder particles, is in the range of 10 μm to 20 μm.

The pore diffusivity approaches a maximum in these monodisperse packings for the largest particles (and thus largest pores) where the pore diffusion becomes dominated by the molecular diffusion (Kn<<1). In this study, a maximum $N_2$ pore diffusivity of approximately $9 \times 10^{-6}$ m$^2$/s compares to the Maxwell diffusivity (e.g. see Hirschfelder, J., Molecular Theory of Gases and Liquids, John Wiley & Sons, 1964) of $1.5 \times 10^{-5}$ m$^2$/s for $N_2$—$O_2$ at the same pressure (1.5 bara). While one would not expect to achieve free-space Maxwell diffusivity within the confines of a porous particle, the model results provide an indication of how close the Maxwell limit can be approached by pore diffusion. A maximum pore diffusivity of $2 \times 10^{-5}$ m$^2$/s was determined at 0.5 bara for the monodisperse packing. This higher diffusivity at the lower pressure derives primarily from the inverse pressure dependence of the Maxwell component of the diffusivity.

The modelling results show that maximum macropore diffusivity is achieved when the binder particles are identical in size to that of the microporous crystalline powder particles. The purpose of the binder is to bind the adsorbent powder particles together to create a strong, crush-resistant agglomerate. Assuming that binder particles need to be positioned between adsorbent particles to create sufficient binding to form the agglomerate, the volume fraction of binder would necessarily increase as the size of the binder approaches the size of the adsorbent particle. Clearly, the volume fraction of binder becomes significant, even potentially equal to that of the adsorbent volume fraction in a monodisperse mixture of binder and adsorbent particles. High volume fraction of binder is a disadvantage in that the resultant active adsorbent fraction within the agglomerate is reduced such that both separation performance and cost efficiency are compromised. The prior clay bound zeolites teachings suggest that "the medium particle size and the particle size distribution of a binder should be similar to the zeolitic powder" (A. Pfenninger, "Manufacture and Use of Zeolites for Adsorption Processes," pg 163-198, in *Molecular Sieves Science and Technology, vol. 2, Structures and Structure Determination*, ed. By H. G. Karge and J. Weitkamp, Springer-Verlag and Heidelberg GmbH & Co., 1999). It is suggested that 20% clay binder is optimum. However, the prior teachings failed to recognize the limitations imposed upon the pore structure and pore diffusivity from using such high binder content and large binder particles, particularly when using clay binders.

Figure 6:
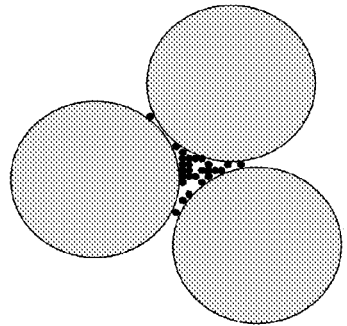
FIG. 6 shows a single packing of polydisperse spheres.
Figure 7:
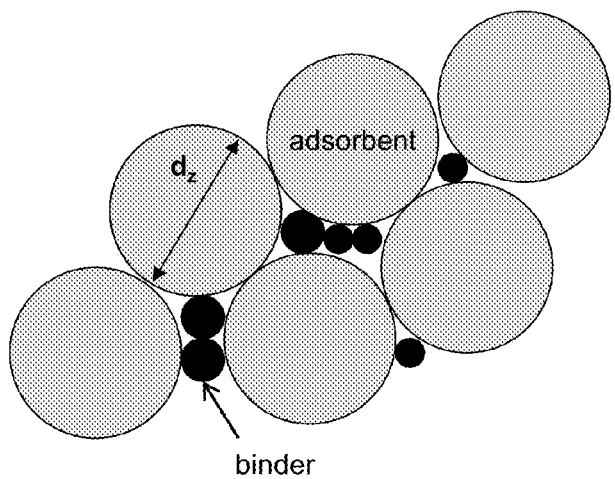
FIG. 7 shows an idealized polydisperse packing of spheres.
Figure 8:
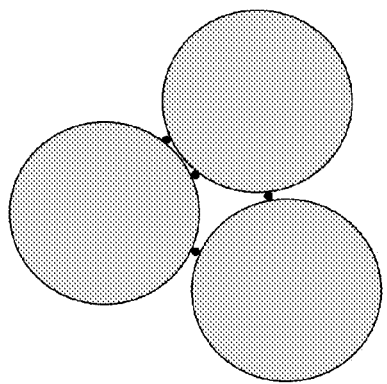
FIG. 8 shows an idealized packing of spheres.

Using smaller binder particles resolves this problem but raises another problem, i.e. plugging of the pore space between adsorbent powder particles with the smaller binder particles as illustrated by the polydisperse packing shown in FIG. 6. Smaller particles begin to fill in the pore space developed between the larger particles when the ratio of diameters (large-to-small) becomes greater than two or three. In such configurations, the agglomerate particle porosity decreases along with the macropore diffusivity. Clearly, the binder particles must be smaller than the adsorbent microparticles for the purpose of good contact binding. However, the volume fraction of binder in the agglomerate needs to be small to maximize adsorbent content as well as to avoid pore plugging. These concepts are illustrated in FIGS. 7 and 8, where the ratio of adsorbent powder particle diameter ($d_A$) is much greater than the binder particle diameter ($d_B$), i.e. $d_A >> d_B$. The effect of reduced binder volume fraction upon pore plugging is illustrated by comparing FIGS. 7 and 8.

In order to quantify the effects of small particle binders, the RSP model was adapted to include adsorbent and binder particles of different size, i.e. each component was monodisperse, but the two components were not the same diameter. The volume fraction of binder was varied from zero (monodisperse adsorbent particles only) to 0.40 (40% binder by volume of particles in the agglomerate). The ratio of adsorbent particle diameter to binder particle diameter was varied from 2.5 to 10. Applying the RSP and diffusion models described above yielded the following criteria for maximizing the pore diffusivity:

$d_B << d_A$, preferably $d_B$ is 0.10 $d_A$ or less, more preferably $d_B$ is 0.01 $d_A$ or less $V_B/(V_A+V_B)$, ≤0.10, preferably $V_B/(V_A+V_B) \leq 0.05$ where $d_B$ and $d_A$ are the diameters of the binder and adsorbent particles, respectively, comprising the agglomerate adsorbent particle. $V_B$ and $V_A$ are the volume of binder and adsorbent particles, respectively. Under these conditions, it was found that $N_2$ pore diffusivities as high as $9.0 \times 10^{-6}$ m$^2$/s (1.5 bara, 300K) could be achieved while maintaining the porosity in the range of 0.35 to 0.40. As the binder content (volume fraction of small particles) increases even modestly from zero to 0.10, the pore diffusivity decreases by nearly 50%. Contrary to prior teachings, the inventive compositions combine a very low volume (or weight) fraction of binder with an average binder particle diameter that is very small relative to the adsorbent particle diameter to unexpectedly produce an agglomerate from monodisperse adsorbent particles with little or no pore plugging and a maximum pore diffusivity. The amount of binder required is only enough to form sufficient bridges between the adsorbent particles as illustrated in FIG. 8. The weight fraction of binder (on a dry basis) is directly determined in the above relationships by simply multiplying the binder and adsorbent volumes by their respective particle densities. Because many binder and adsorbent materials have densities of approximately 1.0 g/cc, the volume and weight fractions of binder are often nearly equivalent.

The practical range of average diameter for agglomerated particles such as beads used in packed bed adsorption processes is from about 0.4 mm to 5.0 mm. The ratio of the average diameter of the agglomerated adsorbent particle to the diameter of the adsorbent powder particle (zeolite crystallite particle) comprising the agglomerate is preferably at least 100 to as much as 1000 in order to achieve an approximately uniform pore structure with good physical strength. As discussed above, larger adsorbent particles, e.g. zeolite powder particles, result in large pores. Compromising between these two effects, it has been determined that the average diameter ($d_A$) of the adsorbent powder particles should be 10 μm or less, and preferably 2 μm≤$d_A$≤8 μm.

Adsorbent powder particle polydispersity, surface roughness and shape were also of interest. In order to simulate these real particle effects, the RSP model was again manipulated. Polydispersity, higher surface roughness and non-spherical shaped powder particles all resulted in lower pore diffusivities than monodisperse, smooth, spherical particles of the same average diameter. This is due to the fact that all of these features of non-uniformity result in more densely packed agglomerate with lower void fraction and a less favorable void structure.

Figure 9:
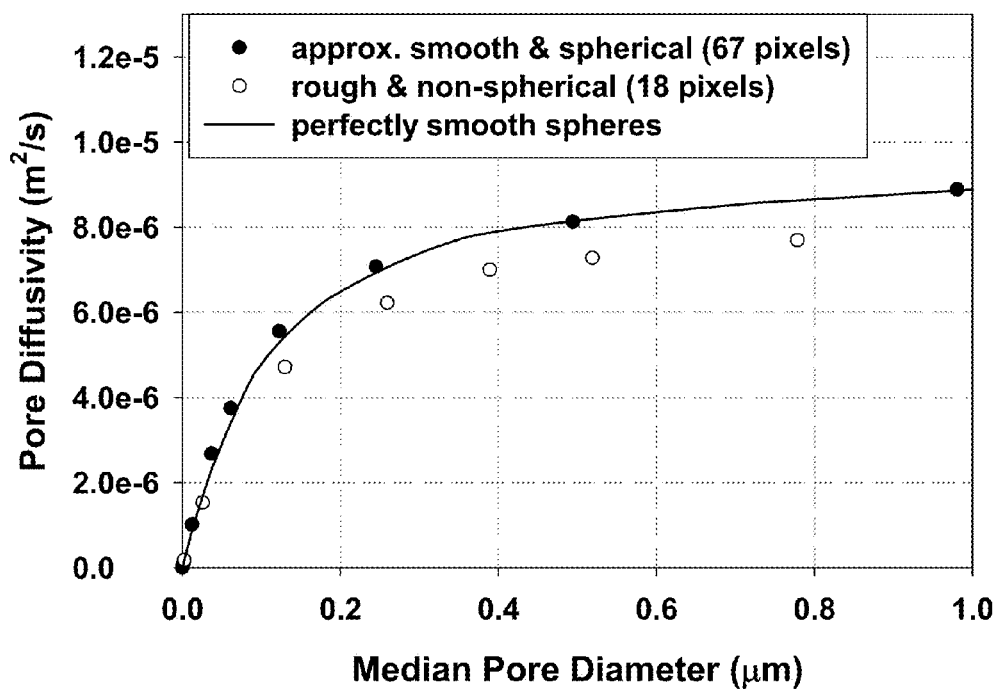
FIG. 9 is a graph showing the variation of intrinsic (pore) diffusivity with median pore diameter for model random sphere packings (RSP) of particles of different degrees of sphericity and smoothness.

The above modelling studies can be summarized in FIG. 9 showing the variation in pore diffusivity with median pore diameter. The median pore diameter (equivalent here to the mean chord length or hydraulic diameter) was determined from the chord length distribution within the void structure of the RSP. The median pore diameter was varied by varying the diameter of the monodisperse particles in the RSP from 0.001 μm to 30 μm. The results of three different sets of simulations are presented in FIG. 9: one set with a digitized RSP structure where the diameter of each sphere (Dsp) is represented by 18 pixels (open circles), another set with a digitized RSP structure where Dsp=67 pixels (solid circles) and a third set of simulations performed in the analytic spherical geometry of RSP structure without needing to digitize each sphere (solid line). In the first two cases, sphere resolution accounts for surface roughness and sphericity of the RSP structures, while the third case corresponds to a RSP made of perfectly smooth spheres. It is seen that the set of simulations with Dsp=67 pixels represents essentially smooth spheres, while the set with Dsp=18 pixels shows the effect of roughness and non-sphericity of the particles in the RSP agglomerate. At large pore diameters, the upper characteristic curve approaches the molecular diffusivity of about $9.0\times10^{-6}$ m²/s (1.5 bara, 300K) as presented previously. It is notable that in these model structures that pore diffusivities can be obtained well above $3.0\times10^{-6}$ m²/s (1.5 bara, 300K) as shown in U.S. Pat. No. 6,500,234 for conventional adsorbents) at a median pore diameter as low as 0.1 μm. It is also evident that the most significant increases in pore diffusivity occur in these model structures for median pore diameters up to about 0.25 μm. Beyond this pore diameter, the increase in pore diffusivity is modest.

Summary of Results from Modelling

The modelling studies (random sphere packing plus diffusion simulation) provide valuable insight and guidance for achieving high rate adsorbents. These studies reveal the important characteristics of the combination of the adsorbent powder particles and binder that are responsible for high pore diffusivity. The near impossible task of accurately defining the void structure can be avoided altogether. The ideal agglomerate is then constructed from the following prescription:

1) Adsorbent powder particles:
   Mean particle diameter: 10 μm or less, preferably 2 μm ≤$d_A$≤8 μm
   Monodisperse: $C_v = \sigma/d_A \leq 0.50$, preferably $\sigma/d_A \leq 0.25$
   Smooth spheres
2) Binder
   Mean particle diameter: $d_B \ll d_A$, e.g. $d_B \leq d_A/10$, preferably $d_B \leq d_A/100$
   Volume Fraction of binder: $V_B/(V_A+V_B) \leq 0.10$ preferably $V_B/(V_A+V_B) \leq 0.05$
   These raw materials are then to be agglomerated in such a way to achieve the following properties of the agglomerate:
3) Macroporosity (Hg porosimetry): $0.30 \leq \epsilon_p \leq 0.42$, preferably $0.35 \leq \epsilon_p \leq 0.40$
4) N₂ pore diffusivity: $D_p \geq 3.5\times10^{-6}$ m²/s, preferably, $D_p \geq 5.5\times10^{-6}$ m²/s $C_v$ is a measure of the width or spread of the particle size distribution where $d_A$ is the mean particle size and σ is the standard deviation of the distribution. For the purpose of this invention $C_v = \sigma/d_A \leq 0.50$, preferably ≤0.25 is considered to represent a reasonable approach to monodispersity.

Correlation to Real Materials

The prescription above, derived from model packing and diffusion simulation, guides the experimental efforts to identify the proper binder(s) and agglomeration method(s) to achieve the desired combination of macroporosity and pore diffusivity in the final agglomerated composition. While the prescription is generally applicable to any potential agglomerate, the present invention is preferably used with zeolite adsorbents bound with non-clay type binders. Zeolite powder particles can be obtained in the above prescribed size range, but monodisperse or narrow particle size distribution, perfect sphericity and/or smoothness are more challenging goals with present materials and methods. Furthermore, such characteristics are practical relative to commercial application only if such properties can be achieved economically. Binders must be identified of the proper size, dispersability, binding strength, composition and cost to satisfy the agglomeration requirements. Thus, the starting point is the combination of the adsorbent/binder properties defined in the prescription above, subsequently relaxed (as little as possible) as dictated by the properties of the available real materials. These real adsorbent powders and binders are then agglomerated to maximize the pore diffusivity. As new and/or improved materials become available in the future, the prescription can be more closely attained.

A binding agent is added to an adsorbent prior to or during the agglomeration step to bind the individual adsorbent particles together and to provide overall strength in the agglomerated particle. Individual adsorbent particles within the agglomerate are typically of the micrometer size, while the typical agglomerated adsorbent particle is of millimeter size. For the purposes of this invention, the binding agent has negligible adsorption capacity and/or selectivity relative to that of the adsorbent material when combined in the agglomerated form.

While the strength of the agglomerated particle is not directly related to the pore diffusivity (and is not reflected in the results from modelling), agglomerated particle strength is a practical requirement for commercially viable compositions. For the purpose of this invention, minimum crush strength ($F_c$) is established based upon a standard test applied to single agglomerated particles (e.g. beads). A commercial test apparatus (Tablet Hardness Tester 8M, Dr. Schleuniger Pharmatron, Manchester, N.H.) was used to obtain a 40 bead crush strength average determined from testing finished adsorbent product. For this example, finished product refers to Li-exchanged calcined agglomerate particles dried to a moisture level of ≤0.5 wt %. Crush strength is affected by agglomerated particle diameter. For the purpose of the present invention, minimum crush strength criteria are applied as follows: $F_c \geq 2.0$ lbF for 1.8 mm diameter particle, $F_c \geq 1.6$ lbF for 1.5 mm diameter particle and $F_c \geq 0.0$ lbF for 1.0 mm diameter particle. Crush strength for particle diameters intermediate to these sizes can be interpolated from these criteria. The above crush strength criteria may also be applied to the agglomerated beads after drying and calcination, but prior to Li exchange as a good indicator of the strength of the finished Li-exchanged product. High porosity, insufficient binder content, poor binder dispersion and/or binder type and insufficient calcination are the primary reasons for weak agglomerates.

The binder content of clay-bound adsorbents is commonly reported as the fractional amount of clay contained within the mixture of adsorbent powder and clay binder on a dry weight basis. This usual practice is retained for the purpose of this invention. It is noted that clay bound adsorbents treated with caustic digestion to convert the clay to zeolite also report the binder content on a dry weight basis of the starting adsorbent and clay materials. The final agglomerated adsorbent is "binderless" and thus contains only material that has adsorptive capacity. A more accurate method for determining actual non-adsorptive binder content is to use the McBain $O_2$ test method as described below. The method described above for clay bound adsorbents will provide slightly different results than determined from the McBain $O_2$ method for materials that experience compositional changes after the agglomeration step, e.g. ion exchange, caustic digestion, etc.

For binders supplied as a solid suspended in a liquid, the final binder content is determined by analysis of the agglomerate. An effective measure of the fractional zeolite content of a bound zeolite relative to its unbound crystalline powder analog is the amount of oxygen adsorbed at low temperature and pressure using the McBain $O_2$ test method (see e.g., Bolton, A. P., "Molecular Sieve Zeolites," in *Experimental Methods in Catalytic Research*, Vol, II, ed. R. B. Anderson and P. T. Dawson, Academic Press, New York, 1976), incorporated herein by reference. The fractional zeolite content of the bound zeolite is also a measure of the binder content.

The sample is air dried prior to the McBain test. It is then placed in the McBain apparatus and slowly dehydrated and activated under evacuation overnight, i.e. at a pressure of about $1 \times 10^{-4}$ torr. The temperature is ramped from ambient to about 0.400° C. in eight hours and then held at this temperature for an additional eight hours. The sample is then cooled to liquid $N_2$ temperature (77K) and ultra high purity $O_2$ is introduced and maintained at a pressure of 70 torr until equilibrium is reached. The amount of $O_2$ adsorbed (wt %) is determined gravimetrically through an accurate measurement of the change in length of a calibrated helical spring. This test is performed on a Li-exchanged LSX zeolite powder (reference sample) and also on the agglomerated LiLSX zeolite particles made from this powder (with binder present); both samples ion exchanged to equivalent % Li levels. Similarly this test can be performed on other ion exchanged forms of adsorbents. The difference in wt % $O_2$ adsorbed between these samples relative to the wt % $O_2$ adsorbed by the reference powder represents the fractional binder content, i.e. (wt % $O_2$ (powder)-wt % $O_2$ (agglomerate))/wt % $O_2$ (powder). Multiplying this fractional binder content by 100 results in the wt % binder. This method was used to determine the binder content for the Ludox and IE-2404 binders used in the examples below.

The relevant sizes of the adsorbent powder and binder particles are those that exist in the final agglomerated particles. For some adsorbent powders, e.g. zeolite powders, the size distribution of particles in the agglomerate are reasonably representative of the initial size distribution of the starting adsorbent powder. In other instances, e.g. binder, the size characteristics of the starting material may not be easily discernible or may evolve throughout the agglomeration process, e.g. as is typical for clay binders. Thus, the relevant sizes of the adsorbent and binder particles in the agglomerate are assessed by analysis of SEM images of the agglomerated particles. In the case of the zeolite powders, the starting material size distribution characteristics may also be relied upon within the prescription.

EXAMPLES OF AGGLOMERATED ADSORBENTS

The examples of agglomerated adsorbents provided below for illustrative purposes all start with a NaKLSX powder (obtained from Zeochem LLC, Louisville, Ky. unless otherwise noted); are combined with one of several candidate binders using one of several optional agglomeration methods; are dried and calcined; Li-exchanged; and activated to form a finished LiLSX adsorbent product. While it is usually preferred to perform the ion exchange step on the agglomerated adsorbent, ion exchange of the adsorbent in powder form is not excluded. As used herein, the term "LSX," indicates an X-type zeolite with a $SiO_2/Al_2O_3=2.0$. In all cases hereinafter, the degree of Li exchange is 95% or greater for LiLSX on an equivalent charge basis. The finished product is evaluated by Hg porosimetry characterization to determine porosity and tested in an LDVT apparatus as described above to determine the $N_2$ pore diffusivity at 1.5 bara, 300K. SEM photomicrographs have been produced for several of the example materials and these materials have then been reconstructed for diffusion simulation using the methods described above. The pore diffusivity is then compared for the actual and reconstructed adsorbents. While the example materials are aimed at improving the rate of $N_2$-selective adsorbents for air separation ($O_2$ production), the methods and material applied should be considered non-limiting as these materials and materials produced by these methods and having high $N_2$ pore diffusivity will have superior rate characteristics that can be exploited in other fluid separations. Materials are also tested to insure minimum crush strength as described above.

As discussed above, the particle size and amount of the binder are important to the formation of the most favorable pore structures. The binder composition may also directly influence these properties as the chemical nature of the binder will affect dispersion, coating capability, binder stability and the final agglomerate particle strength. The present invention is directed to non-clay type binders because of the sponge-like, pore-filling nature of clay and its apparent lack of stability in the post-agglomerating manufacturing steps, e.g. in the aqueous finishing and/or drying of wet agglomerates. This lack of stability is due in part to the mobile nature of the clay binder in aqueous environments. Nevertheless, adsorbents made with an attapulgite clay binder have been included here for comparison. Compositions of this invention have also been produced using non-clay binders such as a silicone-derived binding agent and a colloidal silica binding agent. A prior art adsorbent (Z-2) made with kaolin clay binder and subsequently caustically digested and converted to zeolite, is also included for comparison to the higher rate adsorbent compositions of the present invention.

After blending the various ingredients of the adsorbent, the mixture is agglomerated to form particles, which may include beads, pellets, tablets, extrudates and granules. Depending on the form of the adsorbent required, any appropriate piece of equipment can be used as is known in the art. For the beaded type products referred for most packed bed adsorption processes), accretion wheels, Nauta mixers, Marumerizer and rotating pans are all acceptable devices for agglomeration. The purpose of the agglomeration step is to produce agglomerates of the desired size and strength to survive any required additional processing steps, e.g. calcination, ion exchange, activation, screening, etc., as well as to be suitable in packed bed applications. The agglomeration method and equipment can be any that accomplish the object of obtaining agglomerate products with physical and performance characteristics which satisfy the criteria disclosed herein. Several of these methods have been used for producing the adsorbents described in this invention. Both industrial scale (granulation wheel as described by A. Pfenninger, "Manufacture and Use of Zeolites for Adsorption Processes," pg 163-198, in *Molecular Sieves Science and Technology, vol. 2, Structures and Structure Determination*, ed. By H. G. Karge and J. Weitkamp, Springer-Verlag and Heidelberg GmbH & Co., 1999) and laboratory scale agglomeration equipment have been applied to produce the adsorbents described below. It has generally been found that any of these methods can be successfully applied to generate the desired pore structure characteristics and intrinsic diffusivity as long as the properties of the binder and zeolite powder and the desired agglomerated particle porosity are maintained according to the prescription.

Comparative Example A

Commercial Product LiLSX

A commercial LILSX (obtained from Zeochem) combines NaKLSX powder with 12 wt % attapulgite clay binder (Actigel 208) with subsequent beads formed using a commercial scale wheel method. The agglomerated beads are dried, calcined and subsequently Li-ion exchanged to ≥95% of the ion exchange capacity of the zeolite. The Li-exchanged beads are then washed and activated in temperature programmed commercial scale drying equipment. While the detailed process has not been disclosed by the manufacturer, the formulation is assumed to be similar to that described by Weston, et al. (U.S. Pat. No. 7,300,899). The final product had an average bead diameter of 2.0 mm.

Comparative Examples B-H

Commercial LiLSX

These products represent different manufacturing lots and average particle diameters made according to the same method as Comparative Example A. The products and their properties from Comparative Examples A-H are given in Table I.

Example 1

LiLSX (7% Clay)

This adsorbent was made in the same commercial scale equipment according to the same methods as described in Comparative Example A except that the attapulgite clay binder (Actigel 208) content was reduced to 7 wt %.

Example 2

LiLSX (7% Clay)

This adsorbent was made in the same manner as described in Example 1 except that the aqueous NaKLSX and attapulgite clay binder (Actigel 208) slurries were combined through the process of spray drying. Subsequent commercial level manufacturing steps were performed the same as described in Comparative Example A.

Example 3

LiLSX (7% Clay)

NaKLSX powder was mixed with Actigel 208 (7 wt %) to form beads ("green" beads) according to the same methods described in Comparative Example A using commercial scale equipment. After air drying, a representative sample (10 kg) of the commercial batch of these beads was then further processed by laboratory methods and equipment as described below.

The product beads were air dried overnight prior to calcination using a shallow tray method at temperatures up to 593° C. The shallow tray calcination method used a General Signal Company Blue M Electric oven equipped with a dry air purge. The adsorbents were spread out in stainless steel mesh trays to provide a thin layer less than 0.5 inch deep. A purge of 200 SCFH of dry air was fed to the oven during calcination. The temperature was set to 90° C. followed by a 360-minute dwell time. The temperature was then increased to 200° C. gradually over the course of a 360-minute period (approximate ramp rate=0.31° C./min), and then further increased to 300° C. over a 120-minute period (approximate ramp rate=0.83° C./min) and finally increased to 593° C. over a 180-minute period (approximate ramp rate=1.63° C./min) and held there for 45 minutes before cooling. The calcined beads were subjected to a screening operation to determine the yield and harvest those particles in the 12×16 mesh size range.

Li exchange of the samples (to a Li exchange level of at least 96% Li on an equivalent charge basis) was achieved using the following procedure. A column ion exchange process was used where the samples are packed inside a glass column (dimensions: 3-inch ID) contacted with lithium chloride solution (1.0 M) at 90° C. at a flow rate of 15 ml/min. A preheating zone used before the adsorbent packed column ensured that the solution reached the target temperature prior to contacting the zeolite beads. A 12-fold excess of solution was contacted with the samples to yield products with Li contents of at least 96% exchange and above. After the required amount of solution is pumped through the column containing the samples, the feed is switched to de-ionized water to remove excess LiCl from the samples. A water volume of 50 L and flow rate of 80 ml/min was used. An $AgNO_3$ test, familiar to those skilled in the art, was used to verify that the effluent was essentially chloride free at the end of the washing stage. The wet samples were dried and activated using the calcinations conditions described earlier in this example. The finished product was tested in the same manner as those samples from Comparative Examples A-H.

Example 4

LiLSX (10% Clay)

700.0 g of zeolite NaKLSX powder on a dry weight basis (821.6 g wet weight) were mixed with 77.8 g Actigel-208 on a dry wt. basis (100.7 g wet weight) and 10.5 g F4M Methocel in a Hobart mixer. Water was gradually added over a 90 minute mixing period to bring the final water content to 38%. The mixed product was fed through an extruder yielding 1.5 mm diameter extrudates. The extrudates were spun in a marumerizer at 750 rpm for 30 seconds resulting in a beaded product in the 10×20 mesh size range. The product was air dried, calcined, Li exchanged and activated as described in Example 3 to produce the finished adsorbent.

Comparative Example 1

LiLSX (cd)

For comparison purposes, the caustic digested LiLSX adsorbent described in Ackley, et al. (U.S. Pat. No. 6,506,234) has been included here. This adsorbent (designated "Z-2" in U.S. Pat. No. 6,506,234, in the Test Example above and in Table I) represents a clay-bound agglomerate (12 wt % kaolin in the NaKX (2.0) bead form prior to ion exchange) that is subsequently caustically digested to convert the clay binder to zeolite to form a "binderless" adsorbent. The NaKX (2.0) powder was obtained from UOP, Des Plaines, Ill. A complete description of the formulation and the various steps for making this adsorbent is included in U.S. Pat. No. 6,506,234.

Example 5

LiLSX (7% Colloidal Silica)

69.0 lbs. of zeolite NaKLSX powder on a dry weight basis (88.1 lbs. wet weight) was mixed with 2.1 lbs. F4M Methocel in a Littleford LS-150 plow mixer for 1 minute. Thereafter with the mixer still agitating, 17.3 lbs of Ludox LS-30 colloidal silica (from Dow Chemical) was pumped in at a rate of 1 lb/min. After the Ludox addition was completed, 8.0 lbs of water was added at a rate of 1 lb/min under constant stirring in the plow mixer. At the end of the water addition, plow mixing was continued for an additional 5 minutes before the now mixed products were transferred to a Nauta mixer having internal volume ~3.5 ft3. The Nauta mixing was continued, while gradually adding deionized water to form beads including those in the target 16×20 mesh size range. The product was air dried, calcined, Li exchanged and activated as described in Example 3 to produce the finished adsorbent.

Example 6

LiLSX (7% Colloidal Silica)

3382.0 g of zeolite NaKLSX powder on a dry weight basis (4540.0 g wet weight) were mixed with 54.4 g K4M Methocel in a Simpson mixer-muller for 10 minutes. Thereafter with the mixer still agitating, 910.0 g of Ludox LS-30 colloidal silica (from Dow Chemical) diluted with 1652.0 g water was pumped in at a rate of 60 ml/min. After the Ludox LS-30 addition was completed, mixing was continued for an additional 1 hour. A portion of the mixed product was fed through an extruder yielding 1/16" diameter extrudates. The product was air dried, calcined, Li exchanged and activated as described in Example 3 to produce finished adsorbent.

Example 7

LiLSX (7% Colloidal Silica)

9000.0 g of zeolite NaKLSX powder on a dry weight basis (11523.0 g wet weight) were mixed with 360.0 g F4M Methocel in a Simpson mixer-muller for 10 minutes. Thereafter with the mixer still agitating, 2258.0 g of Ludox LS-30 colloidal silica (from Dow Chemical) diluted with 2986.0 g water was pumped in at a rate of 80 ml/min. After the Ludox LS-30 addition was completed, mixing was continued for an additional 1 hour. A portion of the mixed product was fed through an extruder yielding 1 mm diameter extrudates. The product was air dried, calcined, Li exchanged and activated as described in Example 3 to produce finished adsorbent.

Example 8

LiLSX (19% Colloidal Silica)

700.0 g of zeolite NaKLSX powder on a dry weight basis (838.0 g wet weight) were mixed with 10.5 g K4M Methocel and 4.2 g polyethylene glycol in a Hobart mixer for 10 minutes. Thereafter with the mixer still agitating, 259.3 g of Ludox LS-30 colloidal silica (from Dow Chemical) diluted with 276.0 g water was pumped in at a rate of 17 ml/min. After the Ludox LS-30 addition was completed, mixing was continued for an additional 1 hour. The mixed product was fed through an extruder yielding 1.6 min diameter extrudates. The extrudates were spun in a marumerizer at 1000 rpm for 15 seconds, then 800 rpm for 45 seconds, resulting in a beaded product in the 10×20 mesh size range. The product was air dried, calcined, Li exchanged and activated as described in Example 3 to produce finished adsorbent.

Example 9

LiLSX (7% Silicone Derived Binding Agent)

1000.0 g of zeolite NaKLSX powder on a dry weight basis (1270.7 g wet weight) were mixed with 30 g F4M Methocel in a Hobart mixer for 10 minutes. Thereafter with the mixer still agitating, 239.0 g of IE-2404 (a silicone containing silicone resin emulsion from Dow Corning) was pumped in at rate of 12 ml/min. After the IE-2404 addition was completed, mixing was continued for an additional 1 hour, before the now mixed products were transferred to a Nauta mixer having internal volume ~1 ft3 and agitated therein at a speed of 9 rpm. The Nauta mixing was continued, while gradually adding deionized water to form beads, including those in the target 16×20 mesh size range. The product was air dried, calcined, Li exchanged and activated as described in Example 3 to produce finished adsorbent.

Example 10

LiLSX (5% Silicone Derived Binding Agent)

42.80 lbs. of zeolite NaKLSX powder on a dry weight basis (54.60 lbs. wet weight) were mixed with 1.05 lbs. F4M Methocel in a Littleford LS-150 plow mixer for 1 minute. Thereafter with the mixer still agitating, 7.0 lbs. IE-2404 (a silicone containing silicone resin emulsion from Dow Corning) diluted with 7.0 lbs. water was pumped in at a rate of 1 lb./min. 20.5 lbs. of additional water was added gradually over a 1 hour 20 minute period with constant stirring in the plow mixer. Mixing until beads having a porosity, measured using a Micromeritics Autopore IV Hg porosimeter on the calcined product, in the range 35-42% had formed. At the end of this mixing time, beads including those in the target 16×20 mesh size range had formed. The product was air dried, calcined, Li exchanged and activated as described in Example 3 to produce finished adsorbent.

Example 11

LiLSX (5% Silicone Derived Binding Agent)

59.90 lbs. of zeolite NaKLSX powder on a dry weight basis (76.45 lbs, wet weight) were mixed with 0.60 lbs. F4M Methocel in a Littleford LS-150 plow mixer for 1 minute. Thereafter with the mixer still agitating, 9.8 lbs of IE-2404 (a silicone containing silicone resin emulsion from Dow Corning) was pumped in at rate of 1 lb/min. After the IE-2404 addition was completed, 11.0 lbs of water was added at a rate of 1 lb/min under constant stirring in the plow mixer. At the end of the water addition, plow mixing was continued for an additional 5 minutes. The plow mixed powder product labeled hereinafter "the formulation" was transferred to a tilted drum rotating mixer having internal working volume of ~75 L and agitated therein at a speed of 24 rpm. Mixing of the formulation was continued while adding deionized water gradually to form beads. A recycling operation was performed, involving grinding-up and reforming the beads until beads having a porosity, measured using a Micromeritics Autopore IV Hg porosimeter on the calcined product, in the range 35-42% had formed, including those in the target 16×20 mesh size. The product was air dried, calcined, Li exchanged and activated as described in Example 3 to produce finished adsorbent.

porosity ≤40% all had acceptable crush strength. The binding effectiveness of non-clay binders (7wt% Ludox and 7wt% IE-2404) was evaluated by measuring the crush strength of the agglomerated beads (using the instrument noted above) prior to Li-exchange but after drying and calcination, with an average bead diameter of 1.75mm as described in co-pending application 13/530,236. A comparative sample made with 7wt% Actigel-208 clay was also prepared (1.75mm average diameter) and tested similarly. The adsorbent bound with IE-2404 binder exceeded the minimum crush strength criteria and was significantly stronger than the materials made with the other two binders. Based upon these results, adsorbents using 10wt% or less Ludox binder do not fulfill the strength requirements of this invention.

Figure 11:
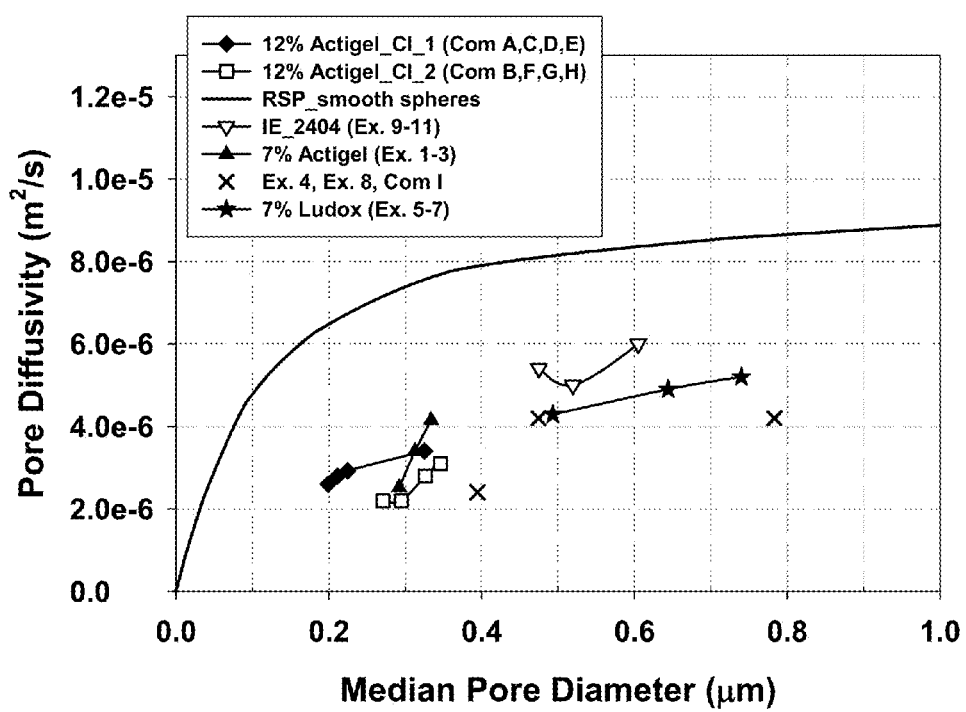
FIG. 11 is a graph showing the variation of experimentally determined intrinsic (pore) diffusivity of various real adsorbents with median pore diameter compared to the ideal characteristic determined from RSP modeling.

The pore diffusivities of the various experimental materials from the examples are shown with respect to the median pore diameter (as determined by Hg Porosimetry) in FIG. 11. The different classes of these materials correspond to the type of binder and method of agglomeration. None of the real adsorbents reach the target diffusivity determined from the model RSPs, although the trend toward this boundary is evident in applying the methods of the present invention. A relatively high $N_2$ pore diffusivity of $6.0 \times 10^{-6}$ $m^2/s$ (1.5 bara, 300K) was achieved using 7 wt % of a small particle silicone derived binding agent.

Comparative Examples A-H represent various commercial lots of LiLSX adsorbents manufactured by Zeochem

TABLE I

Structural and diffusion data for various adsorbents

| Example | Binder Type | Binder wt % | Forming Method | Median Pore Dia. (Micron) | Porosity (%) | Avg. Particle Dia. mm | Diffusivity ($m^2/s$) |
|---|---|---|---|---|---|---|---|
| Com A | Actigel | 12 | Wheel | 0.199 | 37.2 | 2.0 | $2.60 \times 10^{-6}$ |
| Com B | Actigel | 12 | Wheel | 0.295 | 37.1 | 1.0 | $2.20 \times 10^{-6}$ |
| Com C | Actigel | 12 | Wheel | 0.212 | 38.3 | 1.8 | $2.80 \times 10^{-6}$ |
| Com D | Actigel | 12 | Wheel | 0.325 | 36.2 | 1.8 | $3.40 \times 10^{-6}$ |
| Com E | Actigel | 12 | Wheel | 0.225 | 36.4 | 1.0 | $2.93 \times 10^{-6}$ |
| Com F | Actigel | 12 | Wheel | 0.326 | 38.2 | 1.5 | $2.80 \times 10^{-6}$ |
| Com G | Actigel | 12 | Wheel | 0.271 | 39.4 | 1.0 | $2.20 \times 10^{-6}$ |
| Com H | Actigel | 12 | Wheel | 0.346 | 36.7 | | $3.10 \times 10^{-6}$ |
| 1 | Actigel | 7 | Wheel | 0.313 | 37.3 | 1.5 | $3.40 \times 10^{-6}$ |
| 2 | Actigel | 7 | Wheel | 0.292 | 38.2 | 1.0 | $2.52 \times 10^{-6}$ |
| 3 | Actigel | 7 | Wheel | 0.334 | 37.0 | 1.0 | $4.15 \times 10^{-6}$ |
| Com I | CD | 0 | Nauta | 0.475 | 37.9 | 1.25 | $4.20 \times 10^{-6}$ |
| 4 | Actigel | 10 | Ex-Maum | 0.395 | 49.0 | 1.0 | $2.40 \times 10^{-6}$ |
| 5 | Ludox | 7 | Nauta | 0.493 | 45.5 | 1.0 | $4.29 \times 10^{-6}$ |
| 6 | Ludox | 7 | Extrusion | 0.740 | 56.0 | 1.6 | $5.20 \times 10^{-6}$ |
| 7 | Ludox | 1 | Extrusion | 0.644 | 48.5 | 1.0 | $4.90 \times 10^{-6}$ |
| 8 | Ludox | 10 | Ex-Maum | 0.783 | 47.8 | ≈1.4 | $4.20 \times 10^{-6}$ |
| 9 | IE-2404 | 7 | Nauta | 0.605 | 41.0 | 1.0 | $6.00 \times 10^{-6}$ |
| 10 | IE-2404 | 5 | Plow | 0.475 | 39.9 | 1.0 | $5.41 \times 10^{-6}$ |
| 11 | IE-2404 | 5 | tilted-drum | 0.520 | 38.2 | 1.0 | $5.00 \times 10^{-6}$ |

Figure 10:
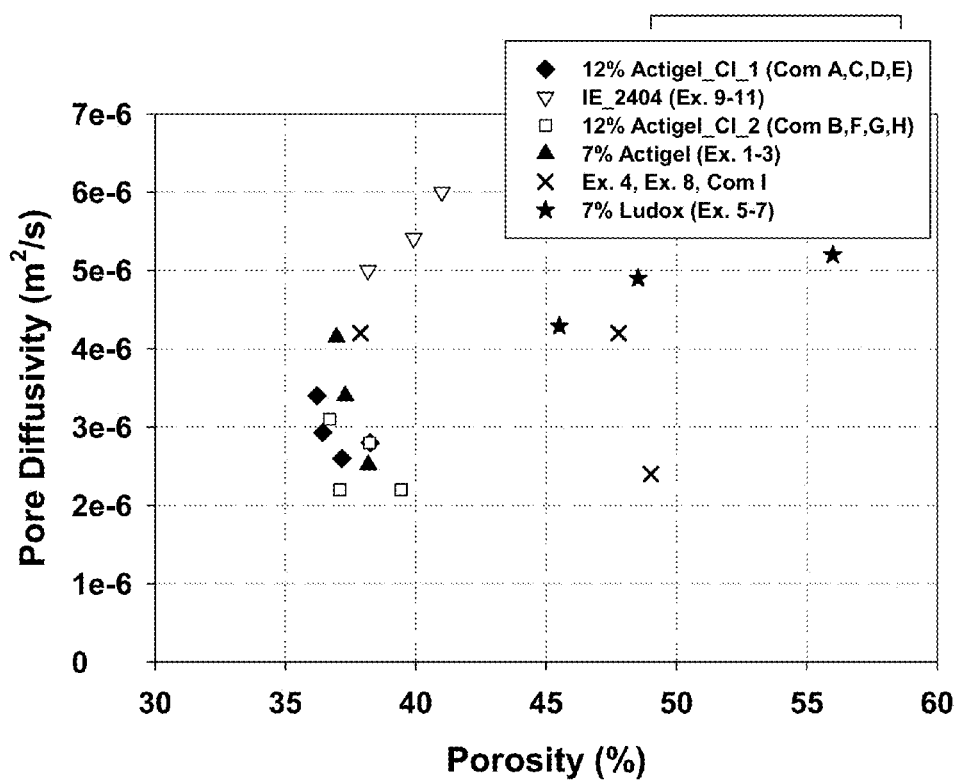
FIG. 10 is a graph showing the variation of experimentally determined intrinsic (pore) diffusivity with porosity of various real adsorbents.

The diffusivity and porosity of the example materials are all compared in FIG. 10. A factor of three in pore diffusivity is observed in these examples within a relatively narrow porosity range of 0.36 to 0.41. These data support the assertion that diffusivity is not a singular function of porosity. More importantly these results reinforce that the diffusivity is a complex function of the pore geometry which cannot be characterized simply in terms of porosity. The adsorption rate remains dependent on both the pore diffusivity and porosity as evident in Equations A-1 and A-2.

Adsorbents produced with porosity >45% (Examples 4, 5-8) generally had unacceptable crush strength according to the criteria established above. Clay bound samples with using conventional methods. The manufacturing methods were maintained consistently using a Actigel 208 binder type and a binder content of 12 wt %. The only intentional change to the method was in the agglomeration stage to grow agglomerated particles to achieve different desired average particle diameters as given in Table I. As shown in Table I and FIG. 11, the average median pore diameter varied between 0.2 μm and 0.35 μm, while $N_2$ intrinsic or pore diffusivity varied from about $2.2 \times 10^{-6}$ to $3.4 \times 10^{-6}$ $m^2/s$. This range of $N_2$ pore diffusivity is consistent with those reported by Ackley, et al. (U.S. Pat. No. 6,500,234) for "conventional" adsorbents.

The amount of Actigel 208 clay binder was reduced to 7 wt % in Examples 1-3 to evaluate the impact of lower clay binder content upon the pore diffusivity. An intrinsic diffusivity of $4.15 \times 10^{-6}$ m$^2$/s was obtained by finishing the commercially produced green beads on a smaller scale in laboratory processing equipment (Example 3) compared to a diffusivity of $3.4 \times 10^{-6}$ m$^2$/s obtained for beads processed by commercial methods (Example 1) as used for Comparative Examples A-H. An attempt to improve the adsorbent powder and clay binder dispersion using spray drying of the wet slurries (Example 2) resulted in essentially no improvement over the standard commercial product (Comparative Examples A-H).

A different means of bead forming was utilized in Example 4, i.e. extrusion of a blend of adsorbent powder containing 10 wt % (dry basis) Actigel 208 clay binder followed by spheronization using a Marumerizer. This laboratory scale adsorbent had high porosity (49%) and low crush strength compared to the other clay bound examples. The $N_2$ diffusivity ($2.4 \times 10^{-6}$ m$^2$/s) was at low end of the range for the adsorbent containing clay binder.

Comparative Examples A-H were subdivided into two classes (C1_1 and C2_2) as indicated in FIG. 11. This approximate classification was based upon distinct differences in the Hg porosimetry characteristics and/or trends in the diffusivity with respect to median pore diameter. This classification not only assists in presenting the data, but emphasizes the apparent differences in the pore structure resulting from essentially the same manufacturing process. Taken as a group, clay-bound adsorbents (Comparative Examples A-H and 1-4) are scattered between boundaries in $N_2$ pore diffusivity of $2.2 \times 10^{-6}$ m$^2$/s and $4.15 \times 10^{-6}$ m$^2$/s, and between median pore diameters of 0.2 μm and 0.4 μm. This group of materials was largely produced by commercial methods but included such variables as agglomerated particle size, clay binder content, clay dispersion method and bead forming method. Because the introduction of these processing and/or composition variables produced only moderate and apparently uncorrelated changes in $N_2$ pore diffusivity, it is concluded that the nature of the clay binder is the dominant macropore structure directing factor. Furthermore, it appears that there are significant limitations to improving adsorption rate using clay binders because of the inherent position of the clay between the zeolite crystallites and the high propensity of the clays to bind with other clay particles and as a result, form non-ideal clay rich regions within the agglomerated structure. Because there are multiple processing steps within which the clay binder can redistribute and/or recombine, it is difficult to maintain any desired distribution attained within one step of the processing due to the instability of this distribution in following processing steps. When compared to the results obtained from the model RSP structures (as in FIG. 11), it appears that the inherently "non-ideal" characteristics of clay binders serve as a barrier to achieving the limit diffusivity of the model structures. Such observations expose the inherent limitations of clay binders in achieving improved pore structure with lower mass transfer resistance (higher intrinsic diffusivity) consistently.

One prior art method aimed at overcoming the inherent limitations of clay binder is to convert the clay to zeolite using caustic digestion (cd). In this method, caustic digestion is performed directly after bead formation and some of the non-ideal clay properties (e.g. location, distribution and redistribution) are at least partially avoided through the conversion of the clay binder to zeolite. However, the sponge-like nature of the original clay and its volume expansion during conversion to zeolite contribute to the unpredictability of resultant pore structure. One comparative cd sample (Comparative Example I, sample "Z-2" from U.S. Pat. No. 6,506,234) had a $N_2$ intrinsic diffusivity of $4.2 \times 10^{-6}$ m$^2$/s (1.5 bara, 300K) has been included here. The same teaching also disclosed a "Z-1" LiLSX material having a $N_2$ intrinsic diffusivity of $5.5 \times 10^{-6}$ m$^2$/s (1.5 bara, 300K), although this latter sample was produced at a very small scale. In any event, caustic digestion adds steps to the processing, is more costly, generates waste solutions that must be properly disposed and results in inconsistent materials.

A non-clay colloidal silica binder (Ludox LS30) was employed to produce samples in Examples 5-8. Binder contents (dry basis) of 7 wt % (Examples 5-7) and 10 wt % (Example 8) were employed with various agglomeration methods, i.e. Nauta (Example 5), extrusion (Example 6) and extrusion followed by Marumerization (Examples 7-8). The results are given in Table I and are also shown in FIGS. 10 and 11. While the $N_2$ intrinsic diffusivities are favorable, the porosity of these samples significantly exceeds the maximum target of 42%. As a result, these adsorbents suffer from reduced strength and lower zeolite content.

Figure 12:
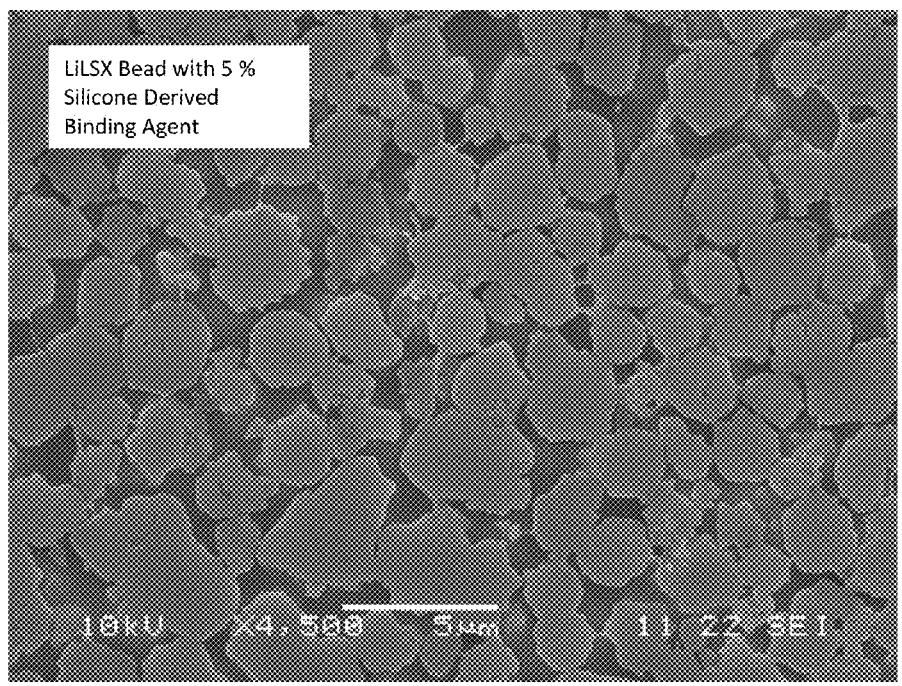
FIG. 12 is a SEM of a cross section of a LiX (2.0) bead (Example 11) at 4500× magnification.

A non-clay silicone derived binding agent (obtained from Dow Corning under the brand name IE-2404) was employed to produce samples in Examples 9-11. Binder contents (dry basis) of 7 wt % (Example 9) and 5 wt % (Examples 10-11) were employed with various agglomeration methods, i.e. Nauta (Example 9), plow (Example 10) and tilted rotating drum (Example 11). The results are given in Table I and also shown in FIGS. 10 and 11. Increased $N_2$ intrinsic diffusivity (as high as $6.0 \times 10^{-6}$ m$^2$/s) was obtained with this binder and within the desired porosity range. Crush strength of the final agglomerated adsorbent was exceptionally good. Only very small binder particles were visible in SEM photomicrographs at 4,500× magnification as illustrated in FIG. 12. The small thread-like particle bridges between the larger sphere shaped adsorbent particles appear to be binder and clearly the size of these binder particles is less than 0.1, or even less than 0.01 times the size of the adsorbent particles. These visible bridges do not account for the total amount of binder, and the remainder binder particles are believed to be smaller than can be visible at this SEM resolution. The large particles were identified as zeolite via the Si and Al content using energy dispersive X-ray Spectroscopy (EDS). The same technique showed much higher Si content of the "binder threads," but the focusing area of the instrument was not small enough to exclude reflection from surrounding zeolite particles. Not wanting to be bound to any particular theory, it appears that the numerous very small Si-rich particles derived from the silicone binder form a broad coating of the zeolite particles providing both high strength and minimal pore blockage.

When considering all of the results in aggregate from the above examples (FIG. 11), it is observed that pore diffusivity $\geq 4.0 \times 10^{-6}$ m$^2$/s (1.5 bara, 300K) is achieved for a range of median pore diameters from 0.3 μm to 0.8 μm, reinforcing the conclusion that the void structure and the resultant pore diffusivity is a more complex relationship than can be simply characterized by median pore diameter. The results of FIG. 10 show a three-fold range in intrinsic diffusivity obtained over a 36% to 41% range in porosity. It is clear then that neither median pore diameter nor porosity, taken individually or in combination, is sufficient pore structure indicators for achieving high intrinsic diffusivity, e.g. $D_p \geq 3.5 \times 10^{-6}$ m$^2$/s. The results above indicate that the binder type, binder physical properties (including particle size, dispersion and stability of said dispersion) and the amount of binder are key factors in directing the pore structure for the purpose of achieving a high diffusivity.

Example 12

Comparing the Diffusivity of Real Adsorbents to their Reconstructed Analogs

Figure 13:
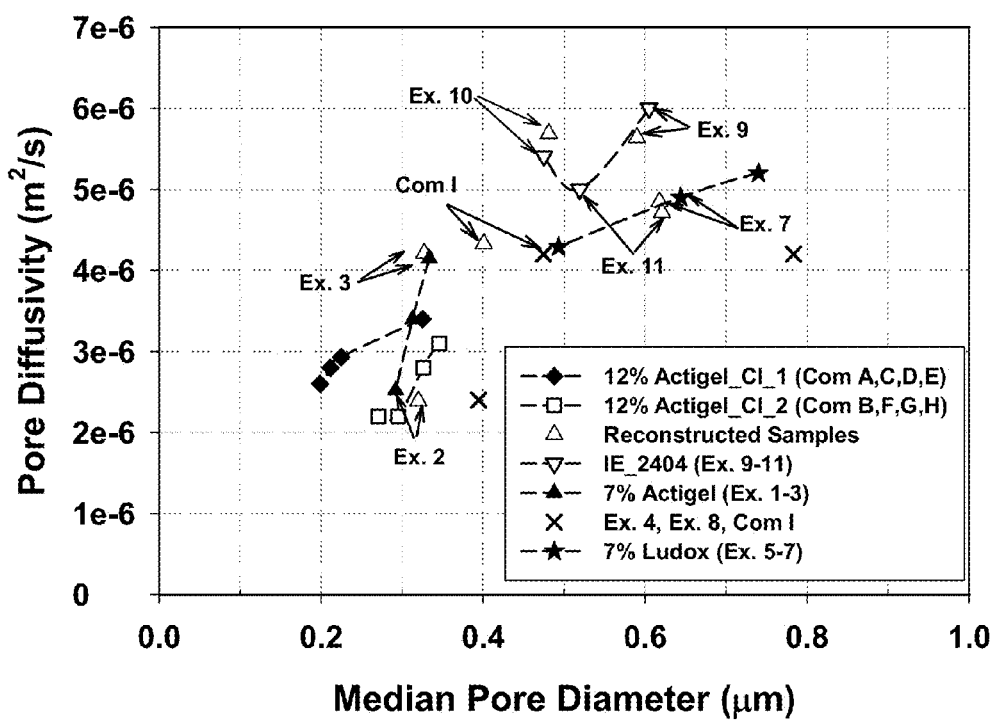
FIG. 13 is a graph comparing the experimentally determined intrinsic diffusivity and median pore diameter of real adsorbents with the model diffusivity and mean chord length determined from reconstructed images of the same real adsorbents.

Using the techniques described above, several of the real, example adsorbents were reconstructed from the SEM photomicrographs of the example adsorbents. Pore diffusivity was then determined by diffusion simulation using the 3D reconstruction of the actual adsorbent. These results are given in Table II and are compared with the experimental results in FIG. 13. The largest differences occur between median pore diameter (determined by Hg porosimetry) and hydraulic diameter (mean chord length) of the pore (determined from the reconstructions) for any given material, a result that also draws attention to the accuracy of pore geometry as determined by Hg porosimetry.

TABLE II

Comparison of Structural and Diffusion Characteristics for Real and Reconstructed Adsorbents

| | Experiments (actual materials) | | | Numerical Experiments (reconstructed materials) | | |
|---|---|---|---|---|---|---|
| Example | Median Pore Diam. (μm) | Porosity (%) | Pore Diffusivity (m²/s) | Hydraulic Diam. (μm) | Porosity (%) | Pore Diffusivity (m²/s) |
| 2 | 0.292 | 38.2 | $2.52 \times 10^{-6}$ | 0.320 | 27.8 | $2.39 \times 10^{-6}$ |
| 3 | 0.334 | 37 | $4.15 \times 10^{-6}$ | 0.327 | 36.1 | $4.21 \times 10^{-6}$ |
| Com I | 0.475 | 37.9 | $4.20 \times 10^{-6}$ | 0.401 | 32.2 | $4.33 \times 10^{-6}$ |
| 7 | 0.644 | 48.5 | $4.90 \times 10^{-6}$ | 0.618 | 33.4 | $4.85 \times 10^{-6}$ |
| 9 | 0.605 | 41. | $6.00 \times 10^{-6}$ | 0.590 | 40. | $5.64 \times 10^{-6}$ |
| 10 | 0.475 | 39.9 | $5.41 \times 10^{-6}$ | 0.481 | 35. | $5.69 \times 10^{-6}$ |
| 11 | 0.520 | 38.2 | $5.00 \times 10^{-6}$ | 0.621 | 32.5 | $4.71 \times 10^{-6}$ |

The comparisons for diffusivity are quite good, further validating the understandings used in developing this invention. In other words, it is expected that the target or limit diffusivity (defined in FIG. 11) can be closely approached when all of the claimed criteria of the high rate prescription are applied.

As indicated from the results of modelling of RSPs, the mean particle size and size distribution of the zeolite crystallites affects the pore structure of the agglomerate. As stated above, it is reasonable to expect the final size distribution of cation-exchanged adsorbent powder particles in the agglomerate to reflect the particle size distribution of the starting unexchanged adsorbent powder. The mean particle size and standard deviation of the distribution of NaKLSX powders were measured using a Horiba laser scattering particle size distribution analyzer LA-910. The results are based upon the volume distribution of particles assumed to be spherical. The mean particle size and standard deviation (σ) for the Zeochem commercial NaKLSX powder are 4.74 μm and 1.98 μm, respectively. This results in a $C_v$=0.42. A NaKLSX powder sample with a larger mean particle size (8.35 μm) was produced in the laboratory. This sample distribution was further characterized by σ=4.83 μm and $C_v$=0.58. Although a larger mean particle size was achieved, the spread in the distribution also increased and thus offsets much of the benefit of larger average particle size in creating a more favorable pore structure. Cost effective powder particle size separation and or improved zeolite synthesis methods must be further developed to generate narrower size distributions of the zeolite powder approaching monodisperse powder particles which will increase further the diffusivity of porous materials. However, the modelling studies performed within this invention provide a clear target for such zeolite powder physical size characteristics.

It is recognized that some of the ideal conditions for attaining maximum diffusivity as identified through the RSP modelling (identified by the characteristics shown in FIGS. 9 and 11) may not yet be fully achievable due to the lack of either adsorbent powder or binder with the most ideal properties. However, this is likely to change as new materials or materials with more desirable properties become available in the future. Thus, target intrinsic diffusivities well above $6.0 \times 10^{-6}$ m²/s are anticipated by the results of the RSP modelling. Thus, the preferable properties of the adsorbent powder and binder are those resulting from such modelling and as supported by the examples in the present invention to the extent such properties of current adsorbent and binder have been successfully implemented and exploited to achieve high $N_2$ intrinsic diffusivity.

The adsorbent materials useful in the compositions of this invention include a wide range of active materials and especially adsorbent powders including zeolites and related molecular sieve materials. Typically X, Y, A type zeolites and natural zeolites may all be used, including ion exchanged zeolites and forms having any suitable cation or cation mixtures and/or $SiO_2/Al_2O_3$ ratio as are well known in the art. Preferred are crystalline zeolites exchanged with cations selected from Li, Ca, K, Na, Ag and mixtures thereof and those having a $SiO_2/Al_2O_3$ ratio ≤15, and more preferred ≤3.5. Most preferred is LiLSX having 95% or greater of the exchangeable cations replaced by Li on an equivalent charge basis. It is also preferred that the agglomerated composition has a mean particle size ranging from 0.4 mm to 5.0 mm.

Clay binders are commonly used in the manufacture of adsorbents. Examples of commonly used clay materials include attapulgite, sepiolite, kaolin, bentonite and montmorillonite and small amounts of clay type binders may be present in the final agglomerate material either added as a processing aid or present as the result of contamination from the use of manufacturing equipment previously used with clay binders. Caustically digested agglomerates which are manufactured with clay binders may also have residual amounts of clay in the final agglomerated material. For the purpose of this invention, the term "binder" describes a binding material having limited clay content such that the final agglomerated material will have less than 1% percent by weight clay material content. Preferably the binder will have substantially no clay content and will be referred to as anon-clay binder. Non-clay binders are binding agents containing substantially no clay components and specifically substantially none of the clay binders described above. Most preferred binders are silicones used as binder precursors which, during the course of adsorbent preparation or manufacturing transform to a form which acts as the binding agent.

Silicones are synthetic compounds comprised of polymerized or oligomerized units of silicon together with predominately carbon, hydrogen and oxygen atoms. Silicones, also commonly known as siloxanes or polysiloxanes, are considered a hybrid of both organic and inorganic compounds since they contain organic side chains on an inorganic —Si—O—Si—O— backbone. Their structures can include linear, branched, cross-linked and cage-like variants.

Silicones have the general formula $[R_2SiO]_n$, where R is one or more organic side groups selected from C1 to C8 organic compounds, including linear, branched and cyclic compounds mixtures thereof and wherein the polymeric or oligomeric silicones are typically, terminated by hydroxy, methoxy, ethoxy groups or mixtures thereof. The silicones of interest generally have molecular weighs ranging from about 100 to more than 500. The R side group can also represent other organic groups such as vinyl or trifluoropropyl and a wide range of silicones are believed to be useful in this invention.

Examples of silicones include, but are not limited to, polydimethylsiloxanes and polydiphenylsiloxanes such as those identified by Chemical Abstracts Service (CAS) Registry Numbers 63148-62-9 and 63148-59-4 and those with di-methyl groups in polymeric forms with methyl, octyl silsesquioxanes such as CAS Registry Number of 897393-56-5 (available from Dow Corning under the designation IE 2404); methyl silsesquioxanes such as CAS Registry Number of 68554-66-5; and (2,4,4-trimethylpentyl)triethoxysilane such as CAS Registry Number 35435-21-3. Preferred silicones are selected from hydroxy, methoxy, or ethoxy terminated polymeric di-methylsiloxane or mixtures thereof with methyl-silsesquioxanes, octyl-silsesquioxanes, methyl octyl-silsesquioxanes, or mixtures thereof.

As described above, the non-clay binders will be present in the agglomerated adsorbent an amount of 10% or less, preferably 7% or less and most preferably 5% or less expressed on a dry weight basis. Since the binder is non-active, it is desirable to have the binder be as small a fraction of the agglomerated composition as is possible while still achieving the necessary crush strength.

While the LiLSX adsorbent examples above are particularly useful in air separation for the purpose of producing $O_2$ and are the most preferred materials, these adsorbents and other compositions made according to the invention with high pore diffusivity are useful in improving a wide range of adsorption, separation, catalytic, and related reactive fluid processes where diffusion rate limitations currently exist. The term "adsorbent" as used herein is intended to include both adsorbents and other active materials used in reactive processes, such as catalysts, with diffusion requirements. Such processes include, but are not limited to, purification, bulk separation and catalytic reactions operating in a cyclical or in steady state mode.

The inventive compositions are particularly useful for the separation of fluid mixtures, preferably gas mixtures, by the adsorption of at least one more strongly adsorbable component from a fluid mixture containing the more strongly adsorbable component and a at least one less strongly adsorbable component. Illustrative commercial processes include, but are not limited to, the purification of hydrogen, the purification of Ar, the separation of certain gaseous paraffins (alkanes) or olefins (alkenes) from gas mixtures, air separation for the production of oxygen and air prepurification by removal of $H_2O$, $CO_2$ and other contaminants including $N_2O$ and hydrocarbons. Preferred processes include, but are not limited to pressure swing adsorption (PSA), temperature swing adsorption (TSA), vacuum swing adsorption (VSA), vacuum pressure swing adsorption (VPSA), etc.

It should be apparent to those skilled in the art that the subject invention is not limited by the examples provided herein which have been provided to merely demonstrate the operability of the present invention. The selection of appropriate adsorbent components and processes for use can be determined from the specification without departing from the spirit of the invention as herein disclosed and described. The scope of this invention includes equivalent embodiments, modifications, and variations that fall within the scope of the attached claims.

The invention claimed is:

1. An adsorbent composition for air separation comprising an adsorbent powder and a silicone derived binder mixed to form an agglomerate having a porosity of $0.30 \leq \epsilon_p \leq 0.42$ and a $N_2$ pore diffusivity $D_p \geq 4.0 \times 10^{-6}$ m$^2$/s and wherein the mean particle diameter $d_A$ of the adsorbent powder is 10 μm or less; the mean particle diameter of the binder is $0.10 d_A$ or less, the median pore diameters range from 0.3 μm to 0.8 μm and the binder concentration is 10% or less expressed on a dry weight basis.

2. The composition of claim 1 wherein the average diameter ($d_A$) of the adsorbent powder particles is 2 μm ≤ $d_A$ ≤ 8 μm.

3. The composition of claim 1 wherein the silicone derived binding agent is present in an amount of 7% or less expressed on a dry weight basis.

4. The composition of claim 3 wherein the mean diameter of the binder is 0.01 dA or less.

5. The composition of claim 1 wherein the $C_v$ of the adsorbent powder particle size distribution is ≤0.5.

6. The composition of claim 5 wherein the $C_v$ of the adsorbent powder particle size distribution is ≤0.25.

7. The composition of claim 1 wherein porosity is $0.35 \leq \epsilon_p \leq 0.40$.

8. The composition of claim 1 wherein the $N_2$ pore diffusivity is $D_p \geq 5.5 \times 10^{-6}$ m$^2$/s.

9. The composition of claim 1 wherein the adsorbent powder is a zeolite with a $SiO_2/Al2O_3 \leq 15$.

10. The composition of claim 9 wherein the zeolite has $SiO_2/Al2O_3 \leq 3.5$.

11. The composition of claim 1 wherein the adsorbent powder is a type X, Y or A zeolite.

12. The composition of claim 11 wherein the zeolite or the agglomerate is ion-exchanged zeolite with cations selected from Li, Ca, K, Na, Ag and mixtures thereof.

13. The composition of claim 12 wherein the zeolite is LiLSX.

14. The composition of claim 13 wherein 95% or greater of the exchangeable cations in the LiLSX are replaced by Li on an equivalent charge basis.

15. The composition of claim 14 wherein the agglomerate composition has a mean particle size from 0.4 mm to 5.0 mm.

16. An air separation adsorption process for adsorbing or separating a more strongly adsorbable component from a fluid mixture containing at least one more strongly adsorbable component and at least one less strongly adsorbable component comprising contacting the fluid mixture with an adsorbent material which selectively adsorbs the at least one more strongly adsorbable component and the at least one less strongly adsorbable component is recovered as product and wherein the adsorbent composition comprises a crystalline adsorbent powder and a silicone derived binder having a porosity of $0.30 \leq \epsilon_p \leq 0.42$ and a $N_2$ pore diffusivity $D_p \geq 4.0 \times 10^{-6}$ m$^2$/s, and wherein the mean particle diameter of the crystalline adsorbent powder is 10 μm or less, the mean particle diameter of the binder is less than or equal to 0.10 $d_A$, the median pore diameters range from 0.3 μm to 0 0.8 μm and the binder content is 10% or less expressed on a dry weight basis.

17. The process of claim 16 wherein the silicone derived binding agent is present in an amount of 7% or less expressed on a dry weight basis.

18. The process of claim 16 wherein the mean diameter of the binder is 0.01 $d_A$ or less.

19. The process of claim 16 wherein the adsorbent powder is a type X, Y or A zeolite.

20. The process of claim 19 wherein the zeolite is an ion-exchanged zeolite with cations selected from Li, Ca, K, Na, Ag and mixtures thereof.

21. The process of claim 19 wherein the zeolite is LiLSX.

22. The process of claim 16 wherein the porosity is $0.35 \leq \epsilon_p \leq 0.40$.

23. The process of claim 16 wherein the $N_2$ pore diffusivity is $D_p \geq 5.5 \times 10^{-6}$ m$^2$/s.

24. The process of claim 16 wherein the $C_v$ of the adsorbent particle has a size distribution ≤0.5.

* * * * *